Figure 1:
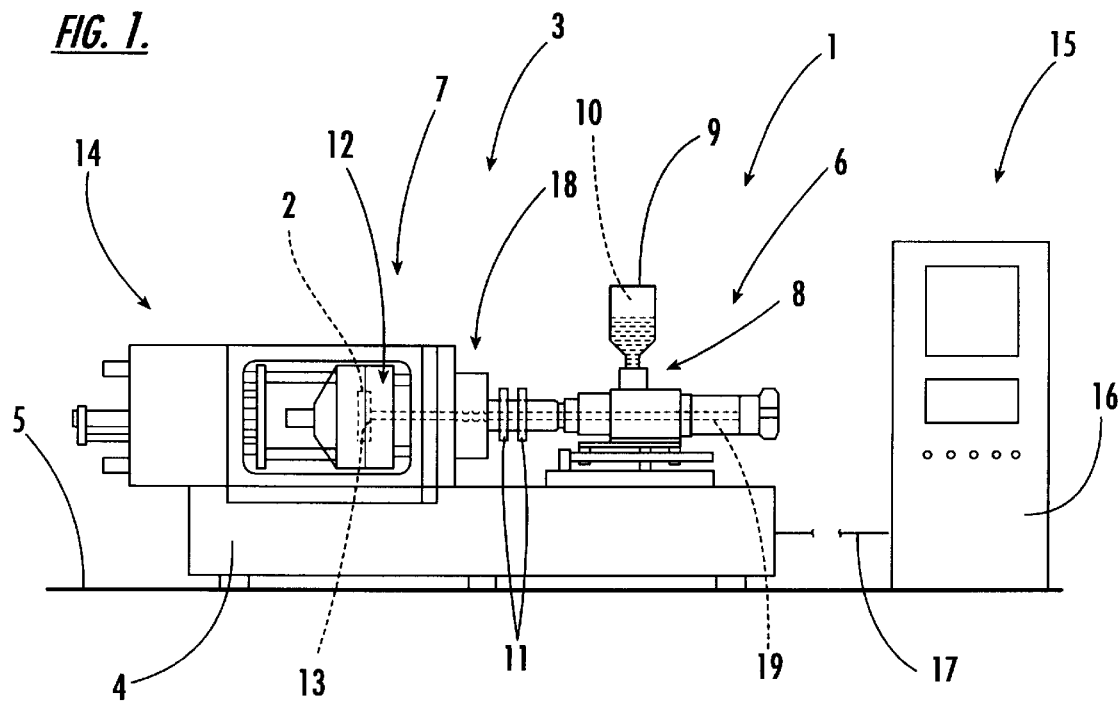

United States Patent
Langecker et al.

[11] Patent Number: 6,106,146
[45] Date of Patent: Aug. 22, 2000

[54] METHOD AND DEVICE FOR MIXING OR THERMAL HOMOGENIZATION OF AT LEAST ONE FLUID

[75] Inventors: Günter R. Langecker, Leoben; Pürstinger Franz, Traun, both of Austria

[73] Assignee: C.A. Greiner & Sohne Gesellschaft m.b.H., Kremsmunster, Austria

[21] Appl. No.: 09/101,065

[22] PCT Filed: Dec. 27, 1996

[86] PCT No.: PCT/AT96/00261

§ 371 Date: Jun. 29, 1998

§ 102(e) Date: Jun. 29, 1998

[87] PCT Pub. No.: WO97/24214

PCT Pub. Date: Jul. 10, 1997

[30] Foreign Application Priority Data

Dec. 29, 1995 [AT] Austria ..................... 2117/95

[51] Int. Cl.[7] .................................................. B01F 5/00
[52] U.S. Cl. ........................ 366/336; 366/338; 366/340; 366/341
[58] Field of Search ............... 366/336, 97, 96, 366/92, 78, 340, 338, 341

[56] References Cited

U.S. PATENT DOCUMENTS

| Re. 33,444 | 11/1990 | Lerner | 366/338 |
|---|---|---|---|
| 2,302,400 | 11/1942 | Stone . | |
| 3,476,521 | 11/1969 | Wise | 366/336 |
| 4,204,775 | 5/1980 | Speer | 366/336 |
| 4,299,655 | 11/1981 | Skaugen | 366/336 |
| 5,335,992 | 8/1994 | Holl | 366/348 |
| 5,347,784 | 9/1994 | Meinecke et al. | 366/336 |
| 5,535,175 | 7/1996 | Niimi | 366/236 |
| 5,779,361 | 7/1998 | Sugiura | 366/336 |
| 5,938,982 | 8/1999 | Sugiura | 366/341 |

FOREIGN PATENT DOCUMENTS

| 2030756 | 4/1977 | Germany . |
|---|---|---|
| 2642105 | 3/1978 | Germany . |
| 4140146 | 9/1994 | Germany . |
| 59-022634A | 2/1984 | Japan . |
| 56-0131145A | 5/1984 | Japan . |
| WO 86/07285 | 12/1986 | WIPO . |
| WO 88/04228 | 6/1988 | WIPO . |

*Primary Examiner*—Tony G. Soohoo
*Attorney, Agent, or Firm*—Alston & Bird LLP

[57] ABSTRACT

The invention relates to a method for mixing and/or thermal homogenization of at least one free-flowing fluid of plastic and/or natural substances, in which the fluid is distributed into a layer (34), the width (36) of which transversely to the conveyance direction (35) of the fluid is greater by a multiple than its thickness (33), and individual partial areas lying in the conveyance direction (35) of the fluid adjacent to one another, in cross-sectional planes in succession in the conveyance direction (35) and aligned vertically to the conveyance direction (35), have a different cross-sectional surface. Respective partial areas extending parallel in the conveyance direction (35) and directly adjacent to one another of the cohesive layer (35) are differently spatially deformed and a cross-sectional surface in the partial area is greater than in relation to a greater flow path length between two cross-sectional planes with a rectilinear connection in the conveyance direction (35).

64 Claims, 23 Drawing Sheets

METHOD AND DEVICE FOR MIXING OR THERMAL HOMOGENIZATION OF AT LEAST ONE FLUID

The invention relates to a method and to a device for mixing and/or thermal homogenization of at least one fluid.

The most varied methods for mixing and/or thermal homogenization of free-flowing fluids of plastics and/or natural materials are already known. In such a method and in a tool fitted for this purpose, according to DE 41 40 146 A1, guide devices are disposed in the flow and/or distributing duct of an extruding tool, said guide devices being distributed via a duct wall at least in individual cross-sectional areas and being spaced apart from one another. These guide devices project via one of the duct walls in the direction of the duct wall opposite it, and thus lead to a reduction in the duct cross-section. In this way it is intended to achieve a good mixture of the melted plastics waste or of the melt in the surface area of the mold sections, or a controlled deflection of portions of the plastic melt in the direction of the middle layer of the molded part to be produced. The deflection of portions of the plastic melt out of the surface areas into the middle layer was satisfactorily accomplished, yet the homogenization of the free-flowing fluid of plastic and/or natural materials achieved with such tools or devices, was adequate only for a proportion of the cases of application.

The object underlying the present invention is to provide a method and a device by means of which at least one free-flowing fluid can be uniformly mixed and homogenised.

A further device in the form of a static mixer for intermixing the most varied flowable media has become known from DE 26 42 105 A1, in which, in a plurality of planes extending parallel to one another and spaced apart from one another, the fluid is distributed into individual partial flows, and these partial flows are offset to one another in transverse planes succeeding one another in the flow direction. Due to the offset arrangement of individual raised portions and flow ducts located therebetween and extending parallel to one another, the fluid is divided into individual partial flows which, due to this offset arrangement, are offset transversely to one another in the successive transverse planes. Because of this arrangement of the raised portions and flow ducts, in the area of each raised portion there is only a lateral flow around the individual raised portions, so that the fluid is divided within the mixer into individual partial flows. Due to the arrangement one above the other of a plurality of plate members, and the arrangement of apertures between the individual flow ducts aligned parallel in the vertical direction, and located in planes spaced apart from one another, in these areas a specific passage or mixing of the individual partial flows can be effected from one plane to the other. Due to the division of the fluid into individual partial flows separated from one another, a new connection procedure of the individual partial flows is again required after passage through the mixer, and the disadvantageous unification of the converging skeins in the contact area must be guaranteed along flow lines, so that uniform homogenization of the free-flowing fluid has not been achievable in all cases of application.

This object of the invention is achieved by procedure is which the layer of free-flowing fluid remains cohesive and unitary over the entire duration of the mixing or thermal homogenization, so that a division into melt skeins and reconnection or unification to a continuous molded part by welding of the skeins coming together in the contact area along flow lines, is avoided. By virtue of the fact however that this continuous cohesive layer is spatially deformed in partial areas extending in parallel in the successive planes in the flow direction, vertical thereto, and are passed over varying lengths of flow paths in individually succeeding longitudinal sections, there is a build-up of spatial laminar flows, which move relative to one another both in layers, i.e. vertically to the layer being mixed, and also in a direction parallel to the flow direction, and thus a higher degree of mixing and good distribution in this unified cohesive layer is achieved. In addition, through the deliberate enlargement of surface, i.e. the enlargement of the flow path surface over shorter distances in the flow direction, a more intensive energy exchange for heating or cooling can be carried out. A surprising feature in this respect is that due to the spatial displacement of partial areas of this layer during mixing, the thermal homogenization can take place over the entire thickness of the layer and not only in its superficial areas.

The object of the invention may also be achieved independently by providing a parallel multiple arrangement of the layers relative to one another inside the guide device, so that in turn the individual layers remain cohesive and unified out of the free-flowing fluid over the entire duration of the mixing and/or thermal homogenization. In this way a higher throughput of free-flowing fluid can be achieved in the same period of time, and an ensuing higher discharge performance. The individual partial areas are moved towards one another or offset in the flow direction or conveyance direction in successive cross-sectional planes vertically thereto, whereupon in the case of a possible connection of the individual layers in the area of the delay chambers, an additional mixing or homogenization of the two layers transported parallel to one another is effected.

Also of advantage is a procedure in which in addition to the transverse offsetting vertical to the layers of individual partial areas of part flows in different spatial directions, an additional branching of partial flows or partial areas of the layers, starting from transitional areas of one layer to the transitional areas of the other is effected, so that a better and more intimate mixing or homogenization of the fluid passing through the guide device is effected. By means of the different flow direction of the individual partial flows or partial areas of the branched-off partial flows, there is likewise an intensive exchange of the free-flowing fluid between the layers.

By means of a further procedure, an equally high discharge rate is ensured over the entire cross-sectional area of the layer, so that fluctuations, for example in the manufacture of hollow profiles or tubes, are avoided.

Preferably continuous relative movement of the parts of the melt relative to one another is effected and in this way the fluid is well mixed over the entire volume.

Advantageously various relative speeds can be achieved over short path distances in the flow direction between the portions of material, in order to accelerate the mixing or homogenization.

A further procedure enables also those usually slower-moving parts of the fluid in the area of the mold surfaces to be superimposed and displaced by the forwardly-moved portions of the fluids at various speeds, so that the thermal homogeneity can be improved over the entire layer thickness.

Of further advantage is a procedure in which a predeterminable uniform pressure drop, at least between the inlet and outlet areas, can be achieved over the entire length of a mixing and/or homogenising area.

The object of the invention is also however independently achieved by providing the varied displacements of the layer by use of the deflecting members and the recesses associated therewith, such that a continuous thermal homogenization with simultaneous high mixing rate is achieved over the entire thickness of said layer.

This object of the invention can however also be achieved independently by a parallel multiple arrangement of the layers passing through the guide device is effected. In this way on the one hand an increased material throughput of the fluid to be homogenised and on the other hand likewise a sufficient treatment is achieved despite the increased throughput.

Further advantageous developments of the device are described, in which a large number of identical parts may be achieved in order to form the guide device, so that economies of cost are achieved in manufacturing terms. Furthermore, by the additional arrangement of connecting openings in the area of the recesses between the two layers running parallel to one another, within the flow ducts, an additional mixing in the contact areas of the two partial flows or partial areas of the layers facing one another can be achieved. An additional and controlled guidance of partial flows, which are branched off from the individual flows, leads to an even more intimate homogenization of the fluid passing through the guide device.

Figure 2:
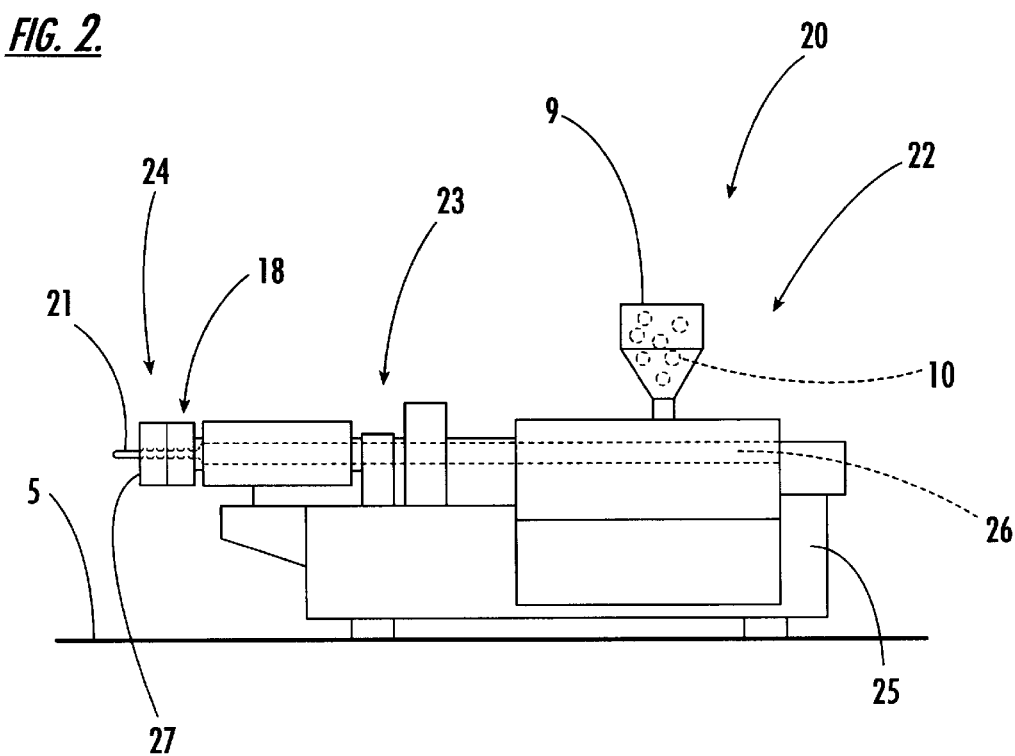
Figure 3:
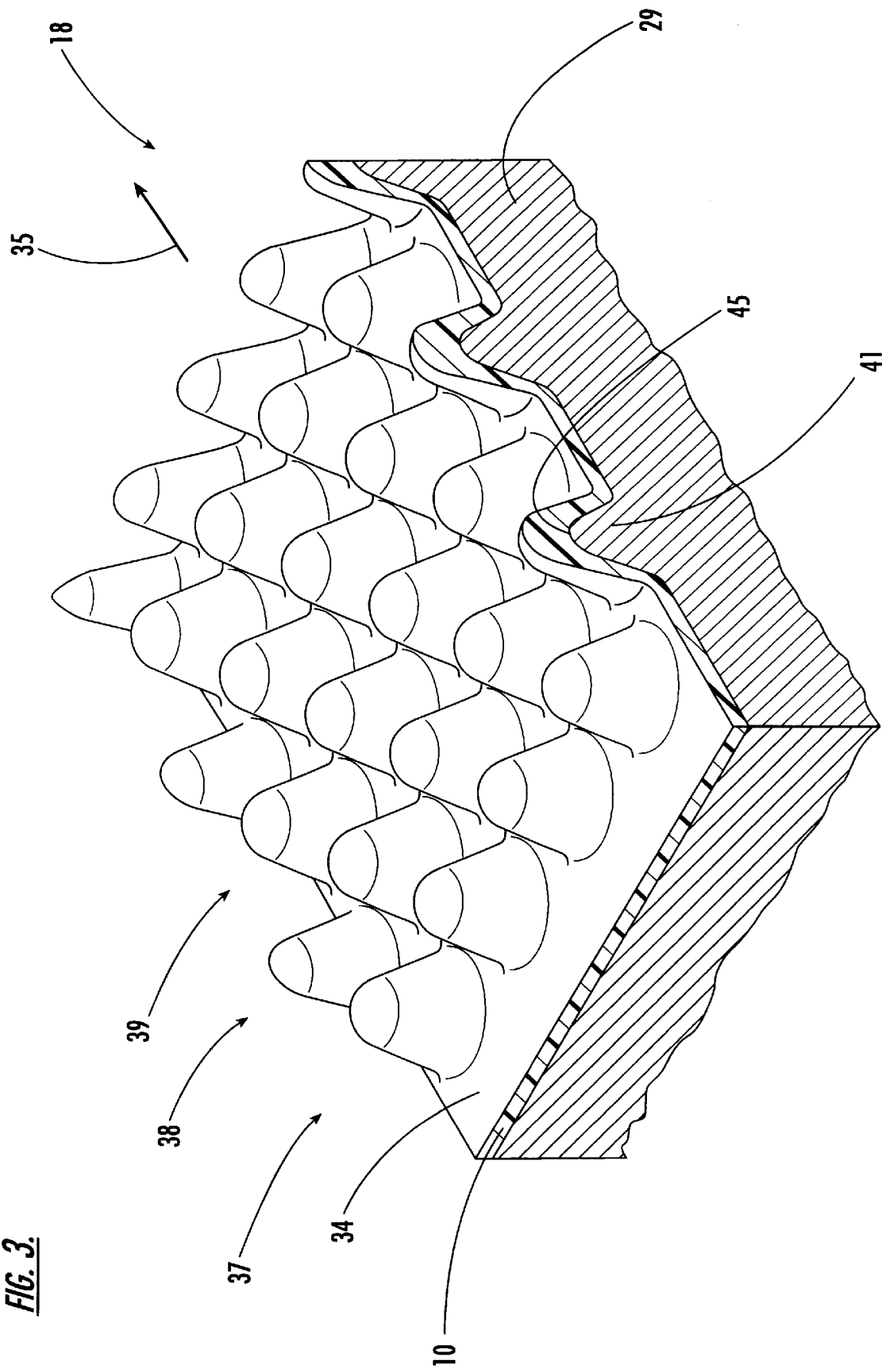
Figure 4:
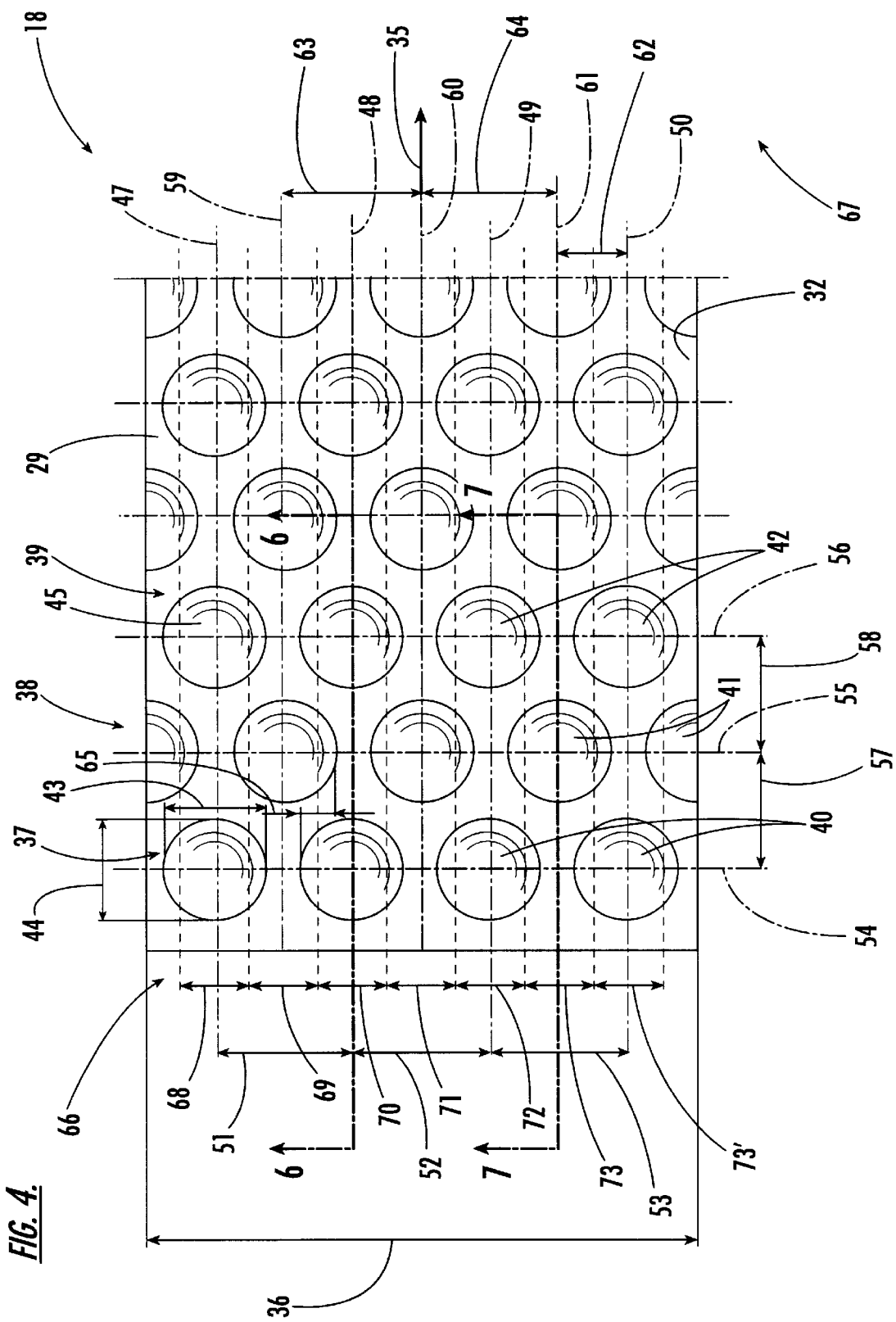
Figure 5:
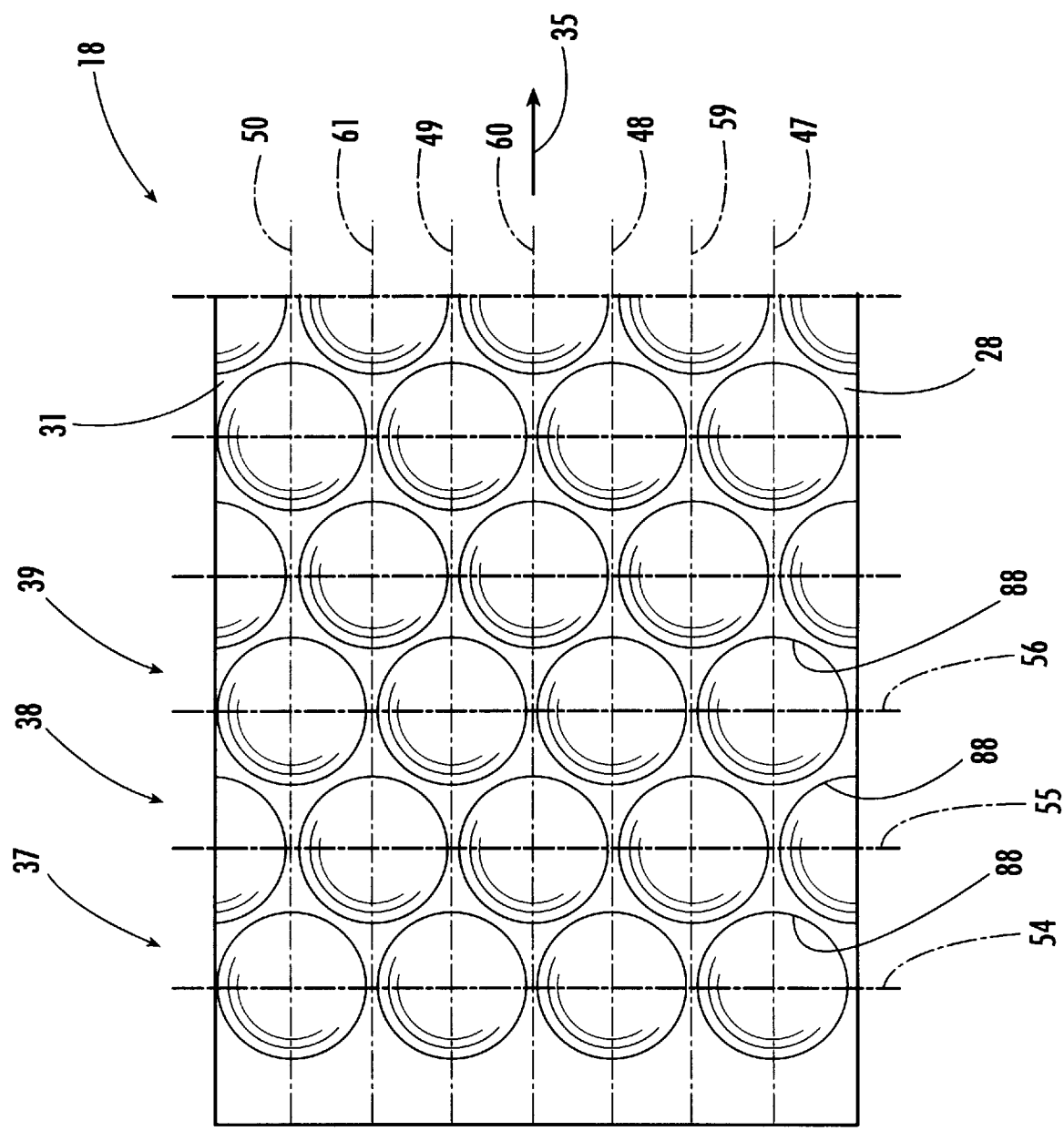
Figure 6:
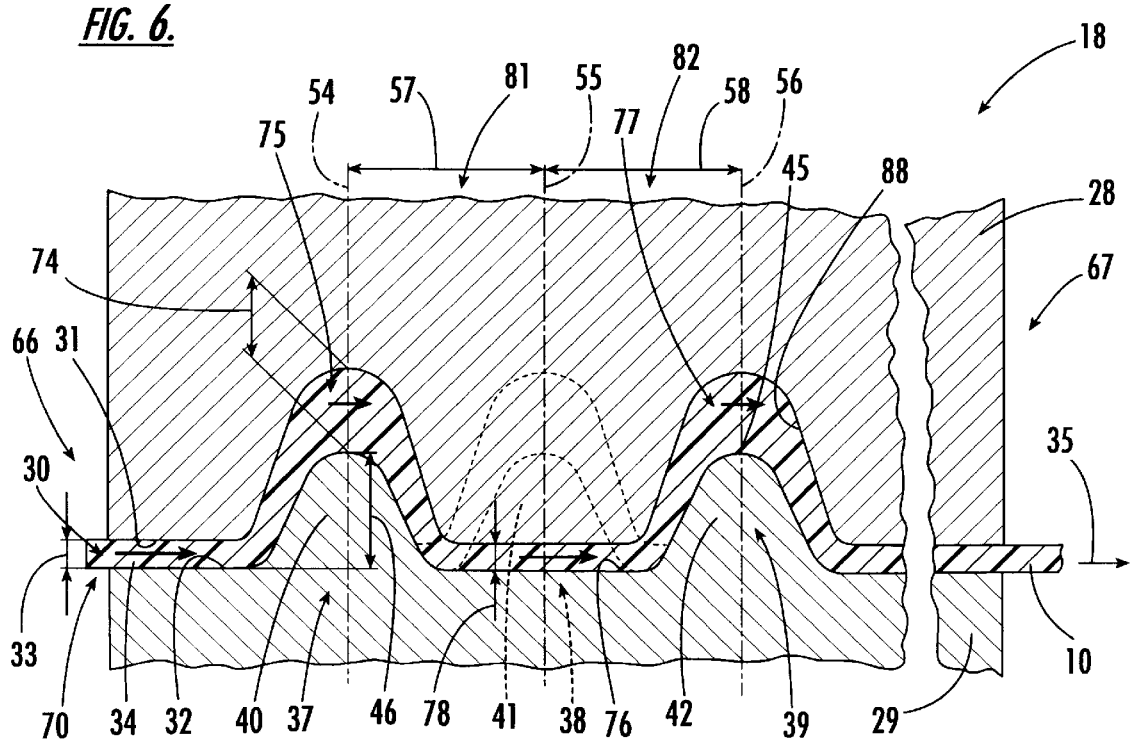
Figure 7:
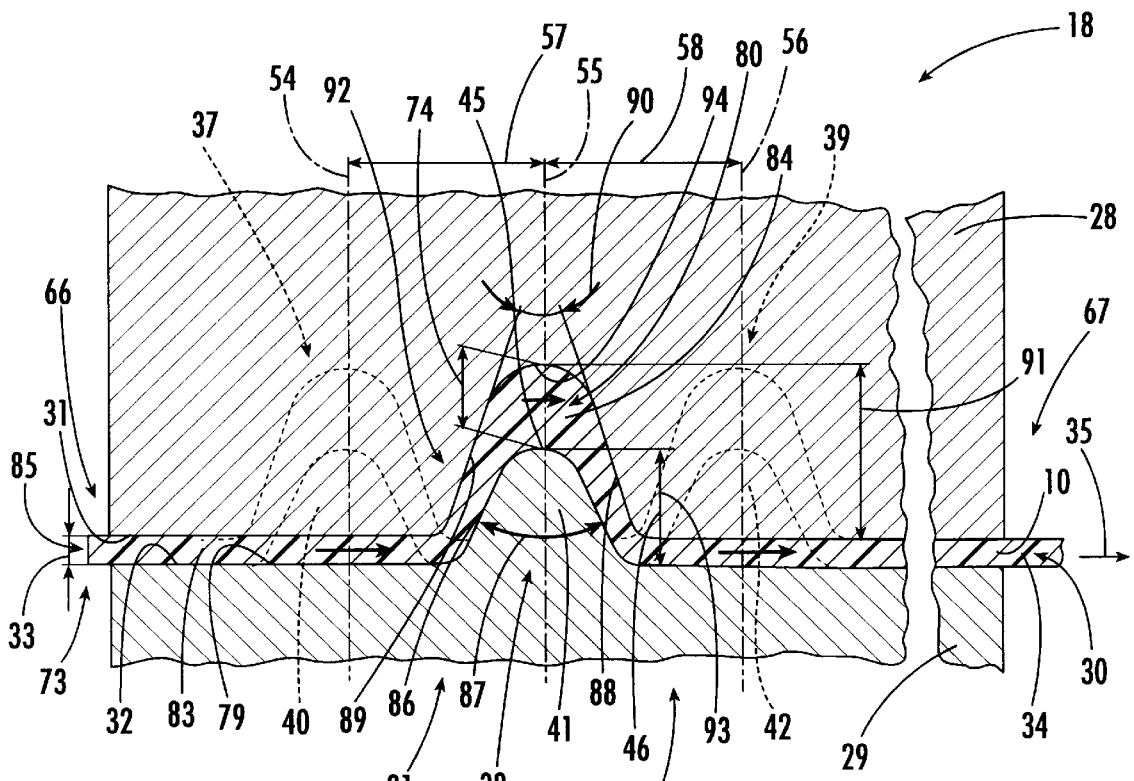
Figure 8:
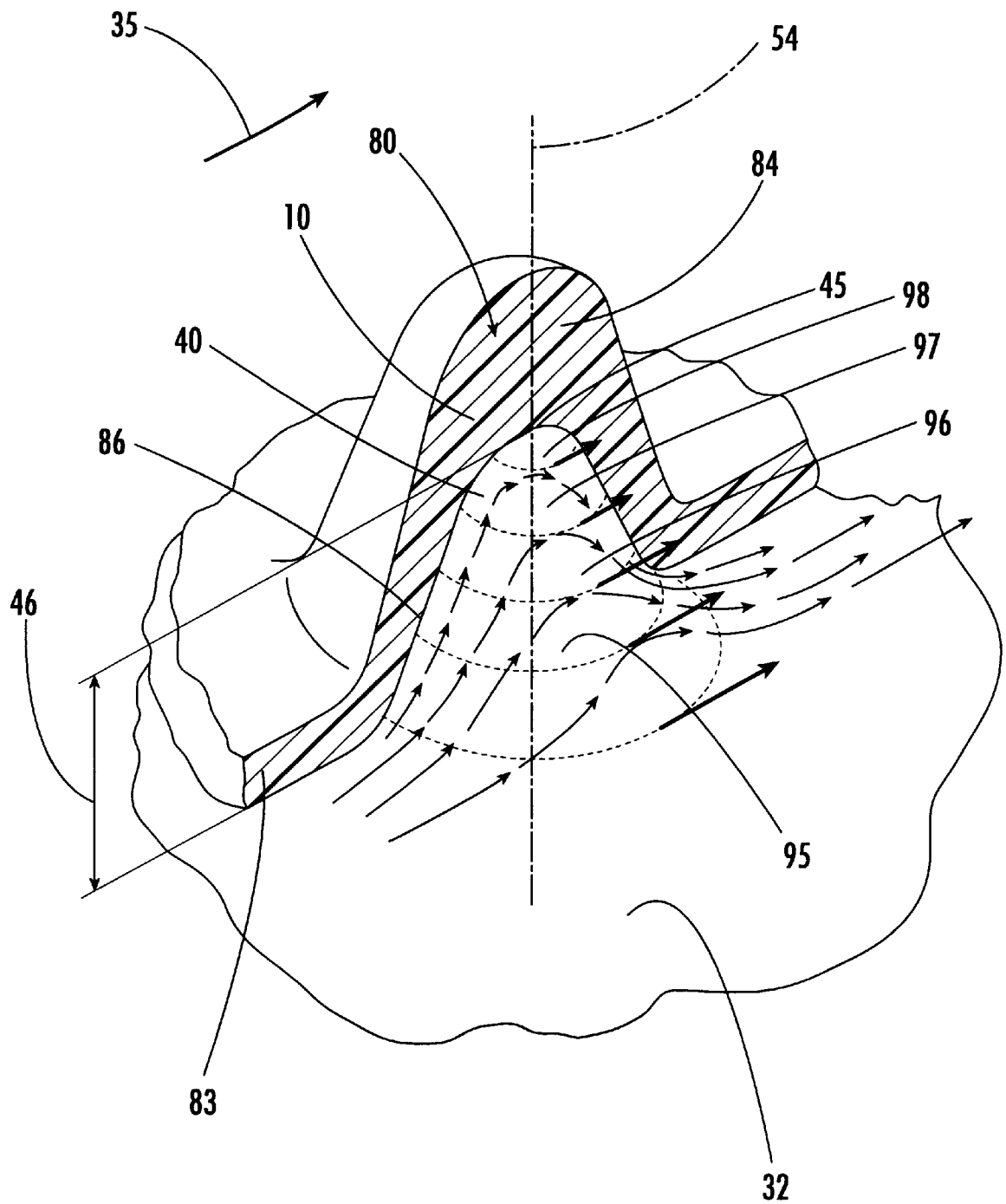
Figure 9:
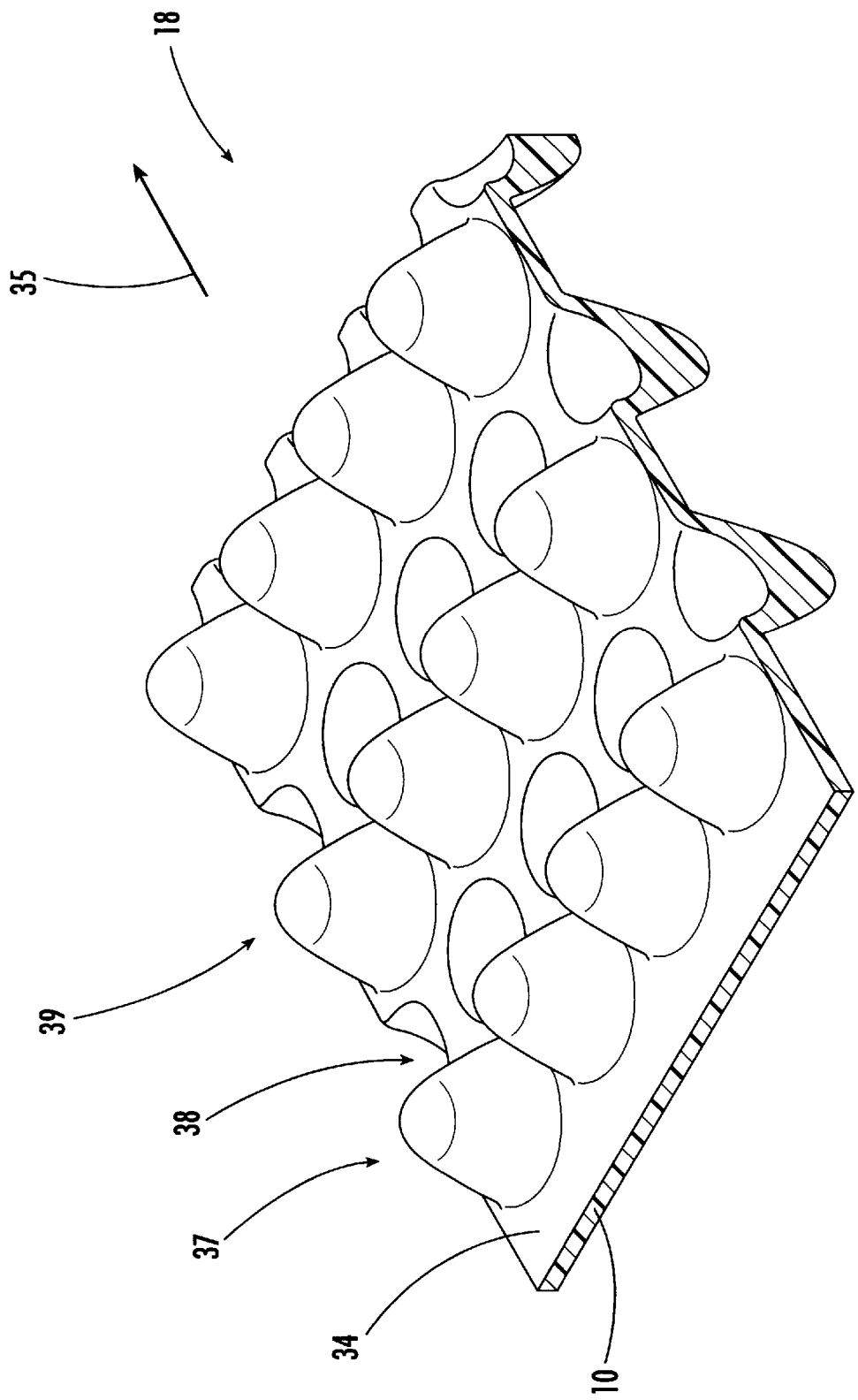
Figure 10:
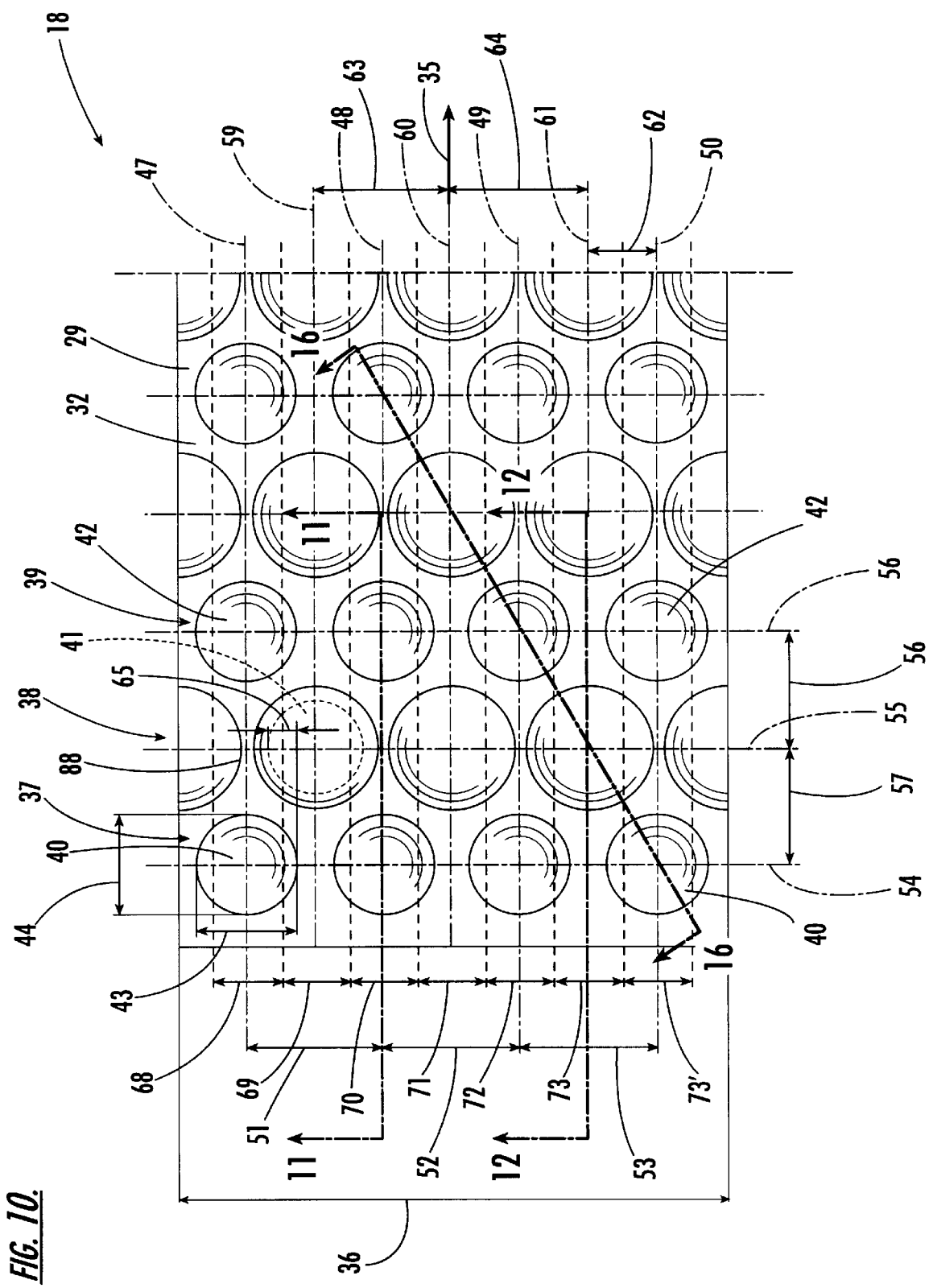
Figure 11:
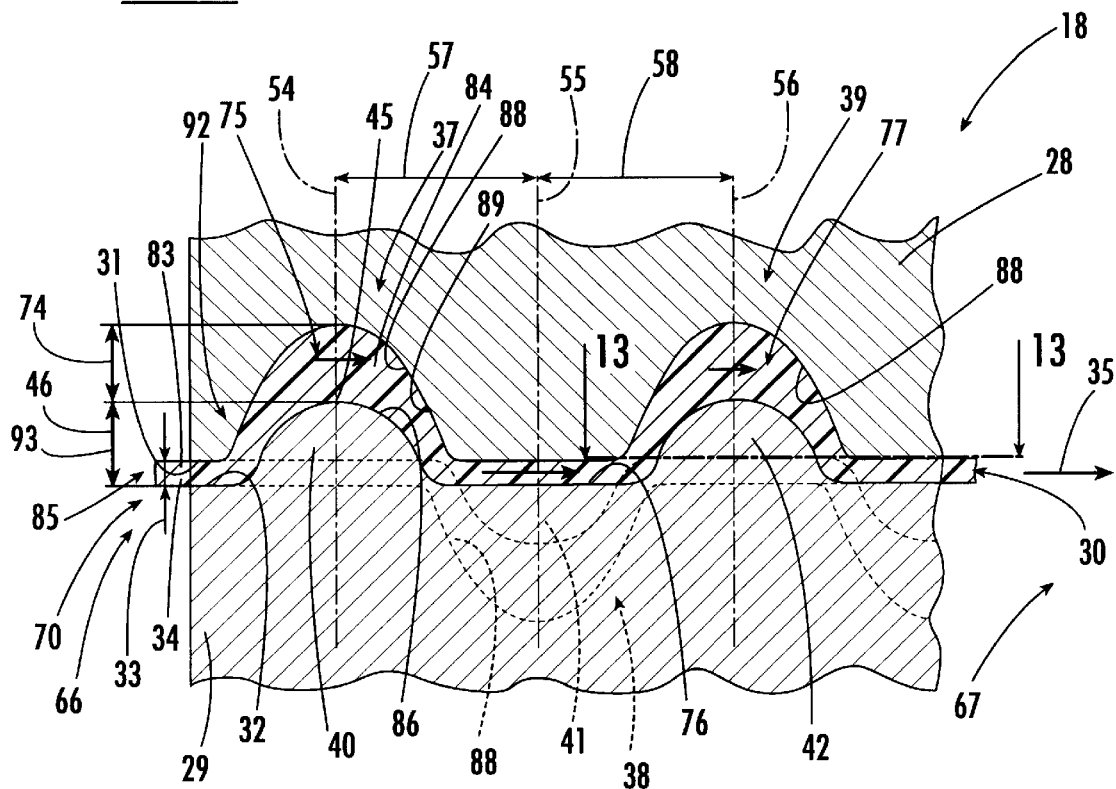
Figure 12:
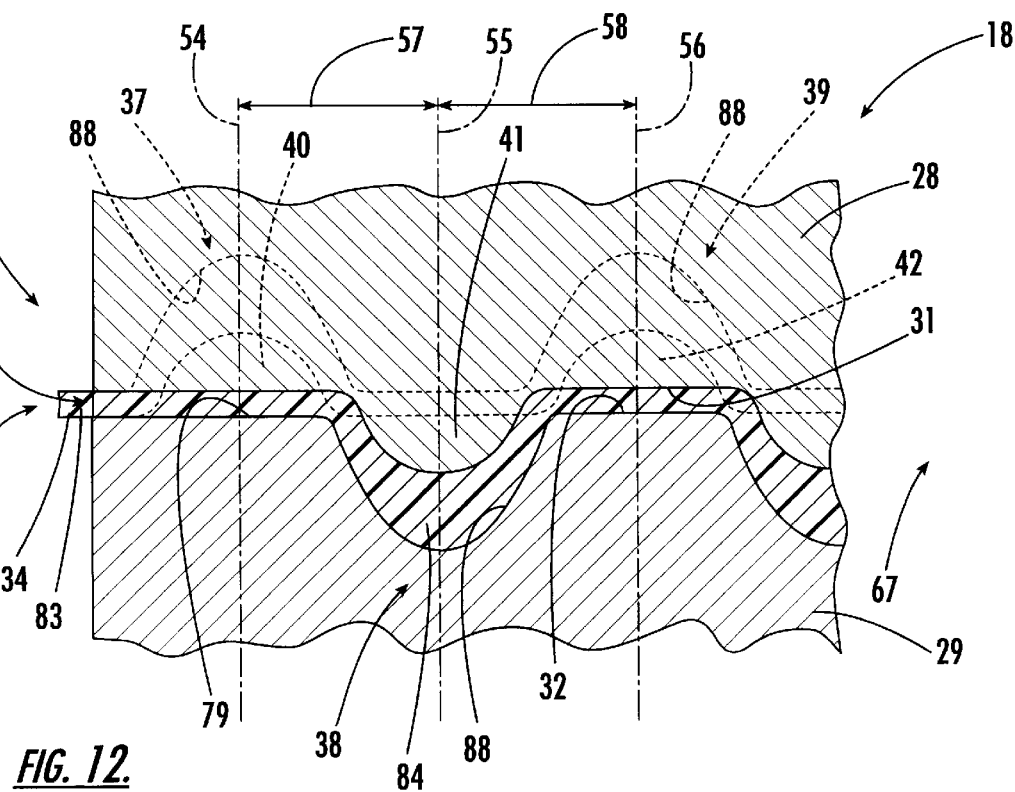
Figure 13:
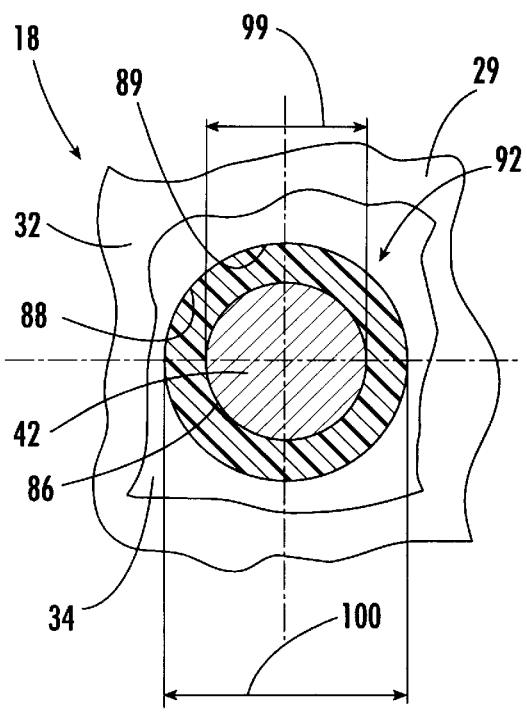
Figure 15:
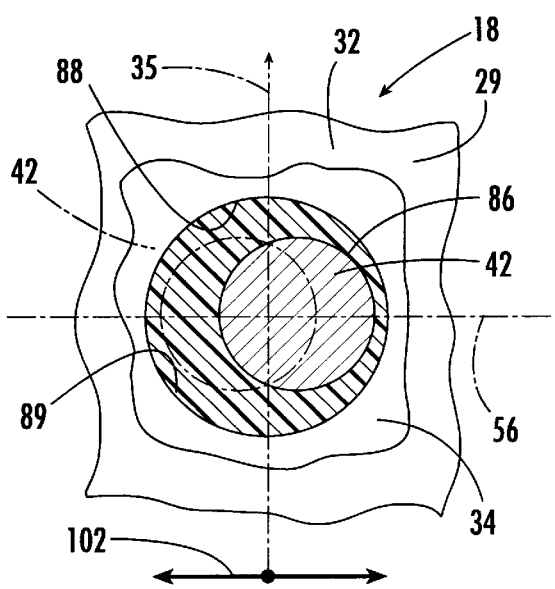
Figure 14:
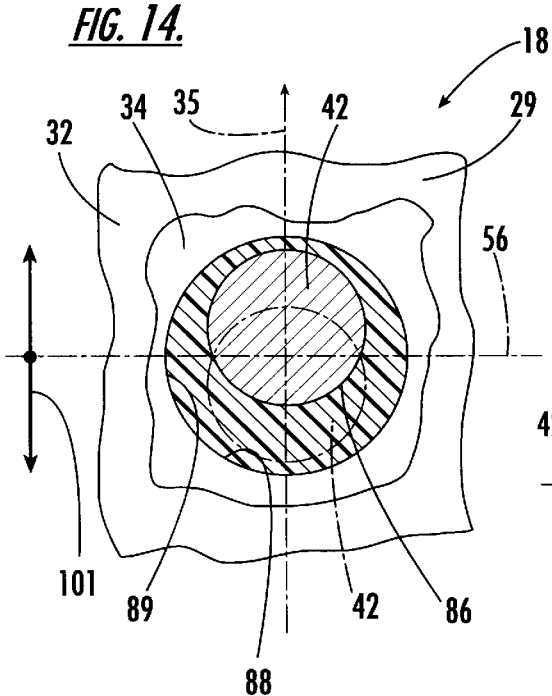
Figure 16:
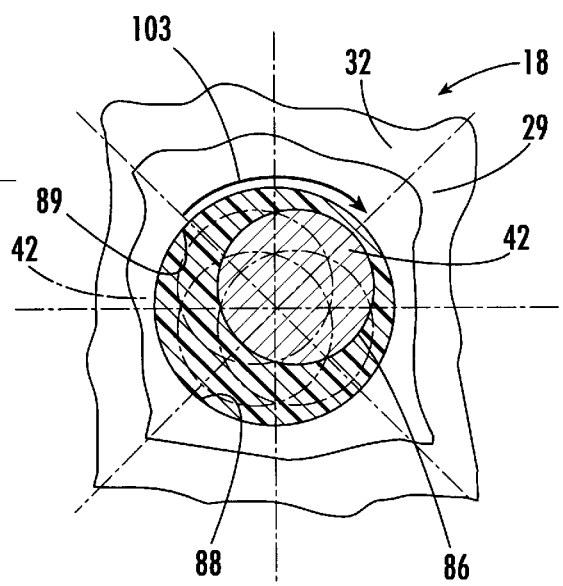
Figure 17:
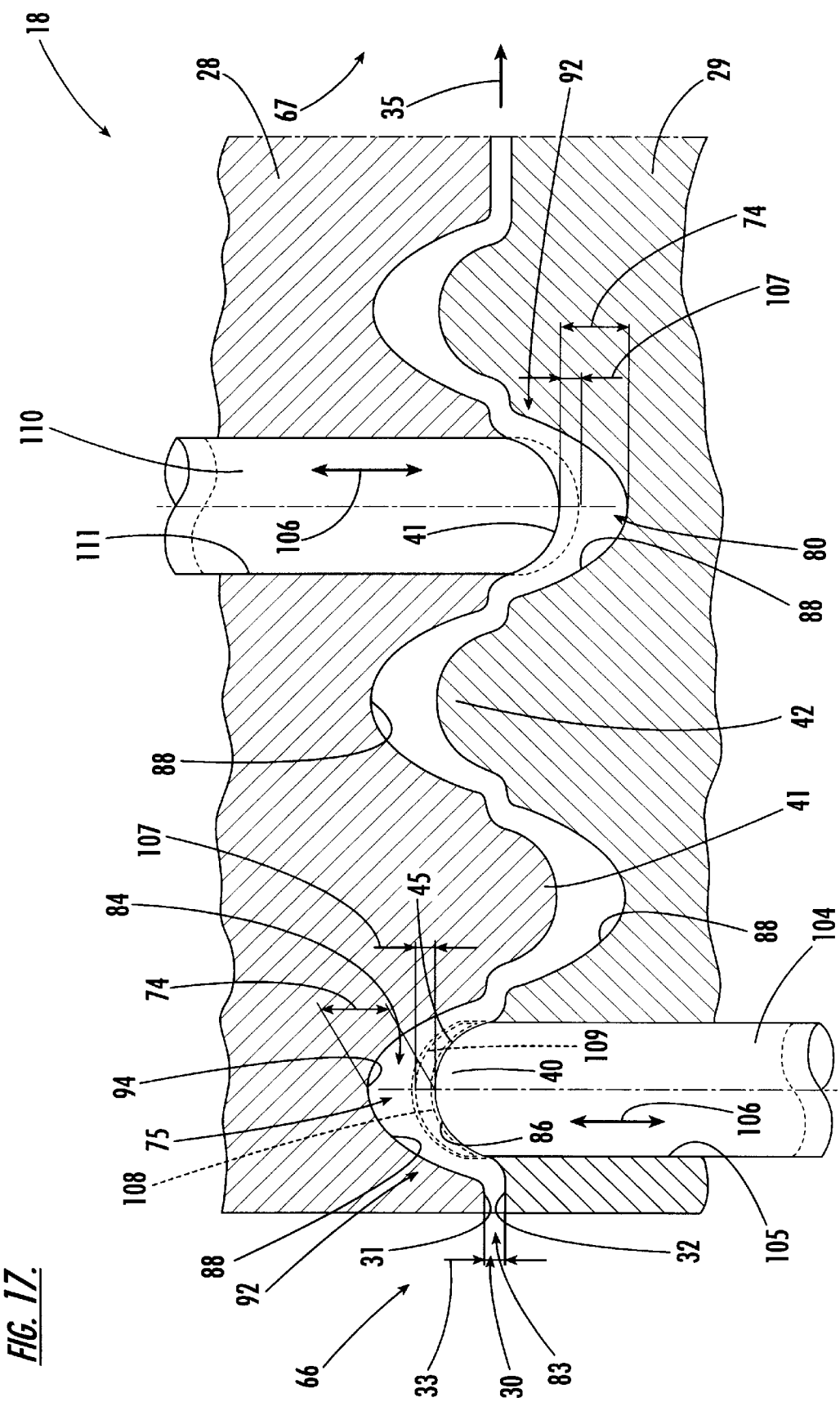
Figure 18:
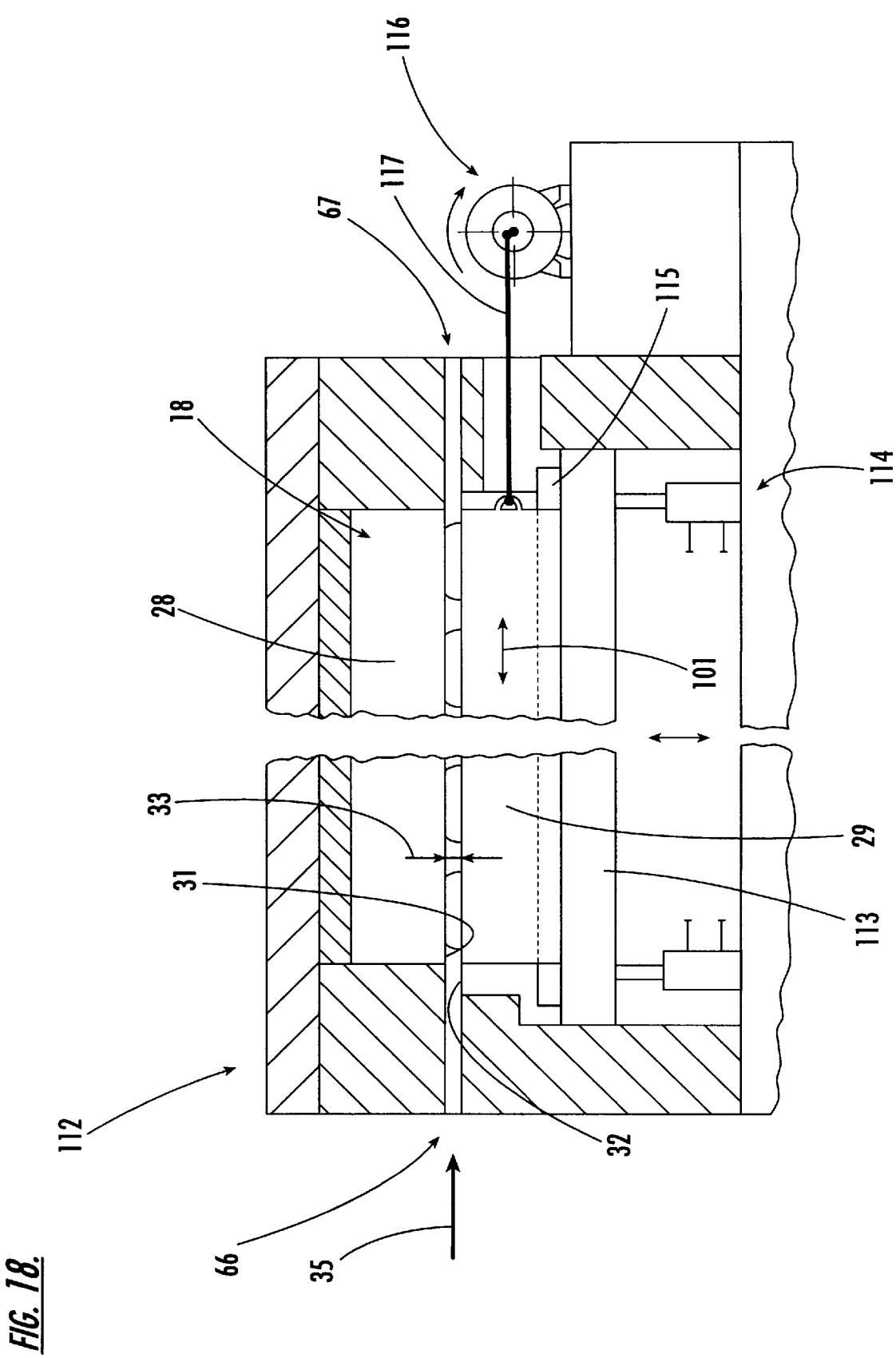
Figure 19:
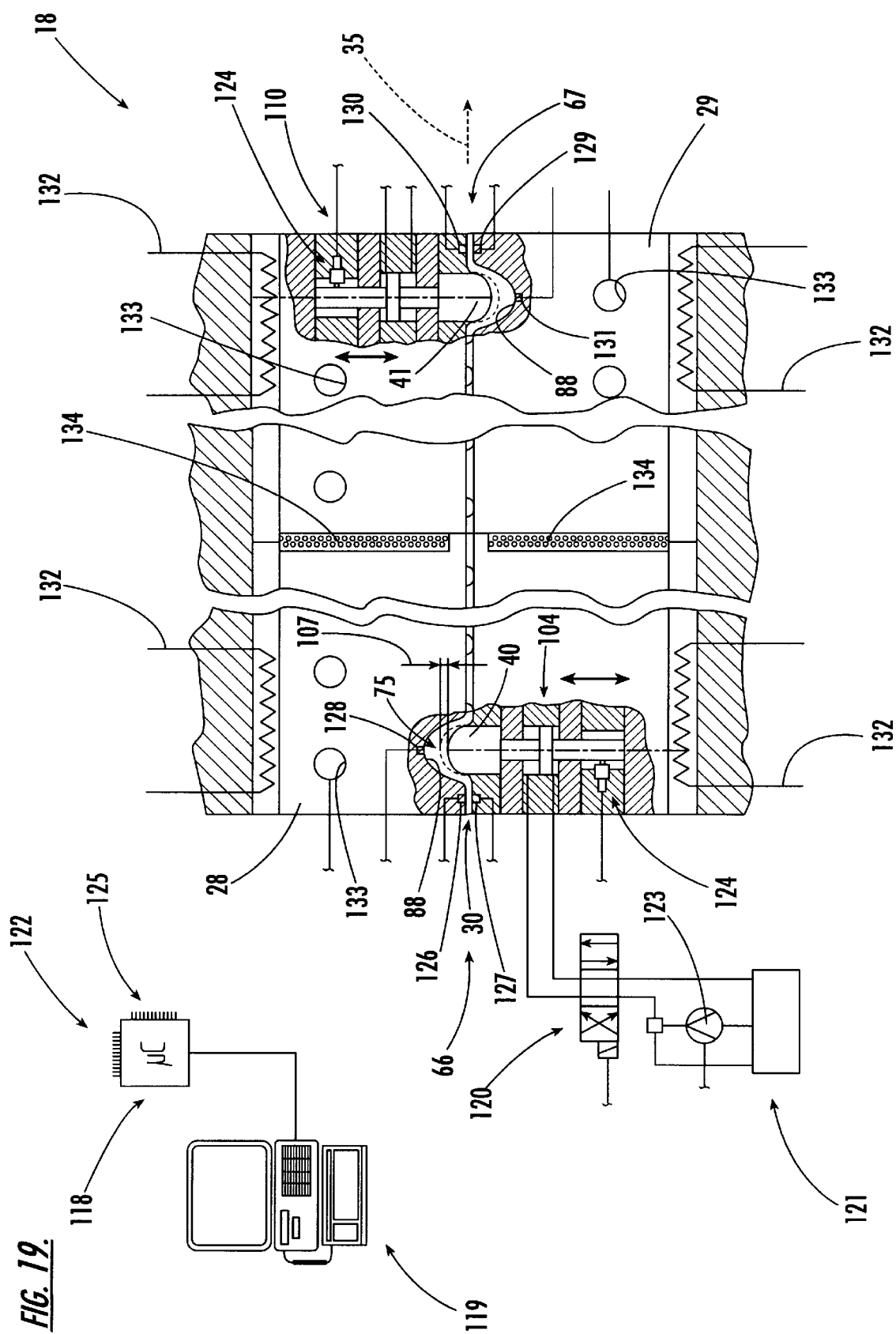
Figure 20:
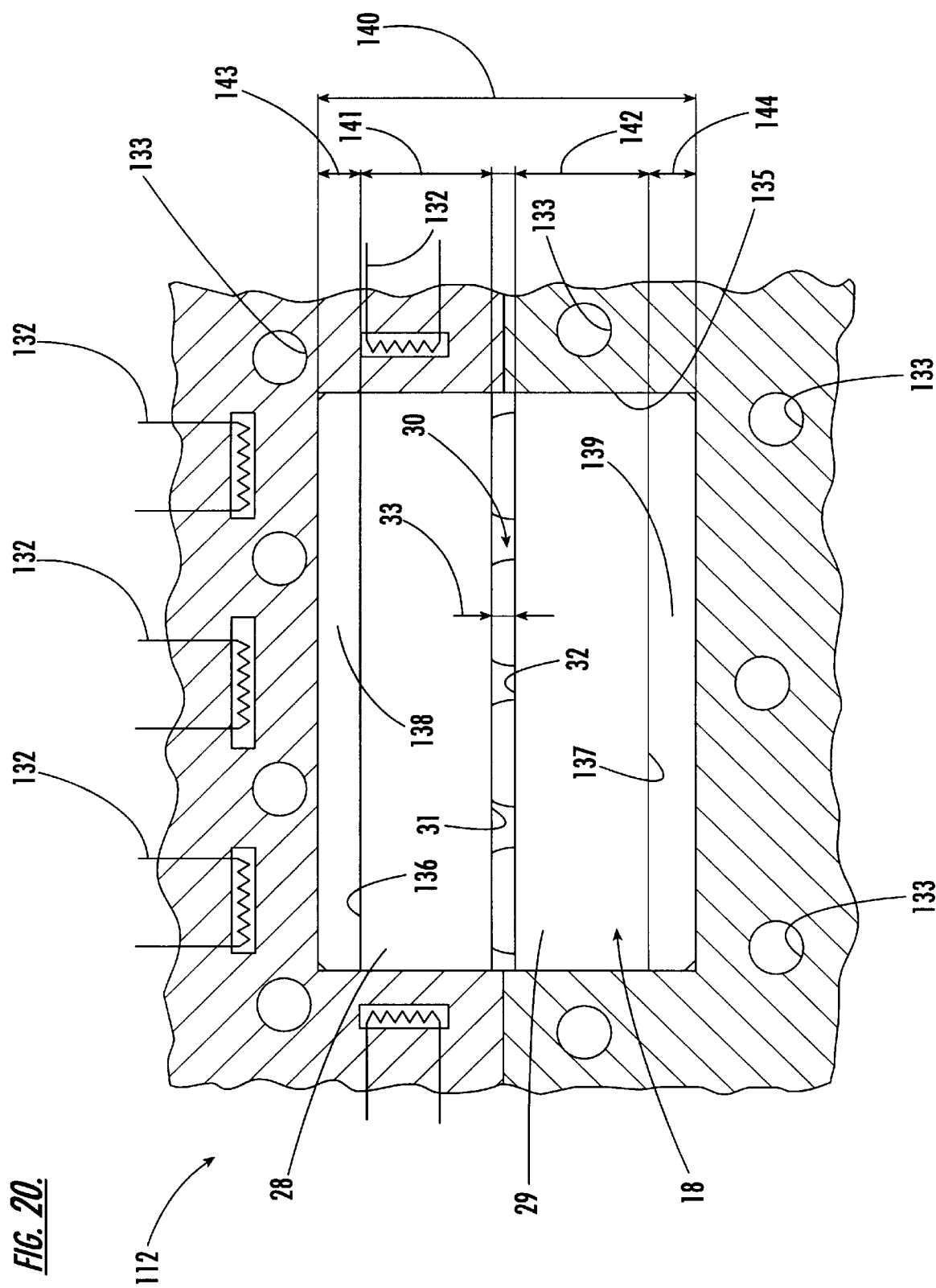
Figure 21:
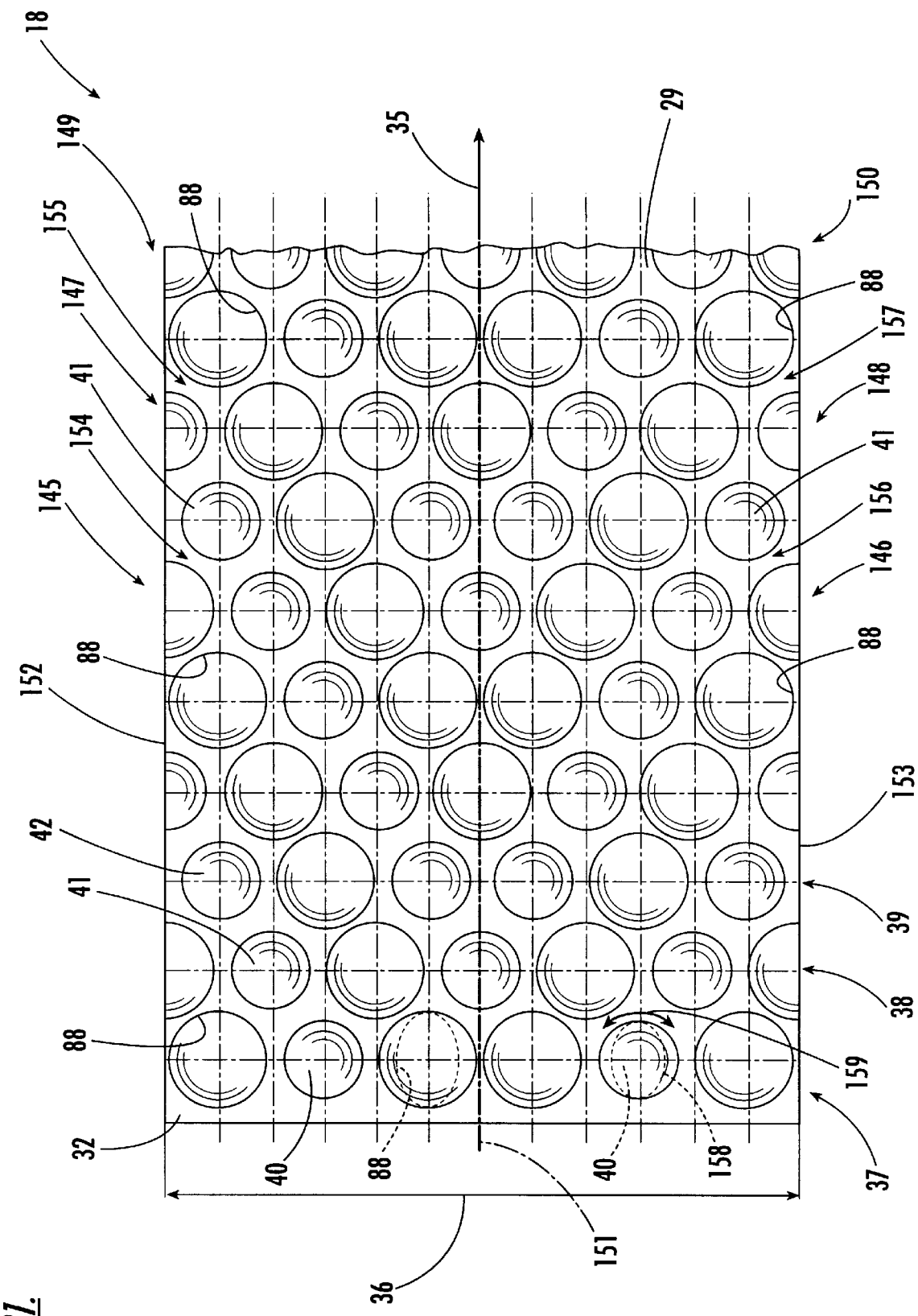
Figure 22:
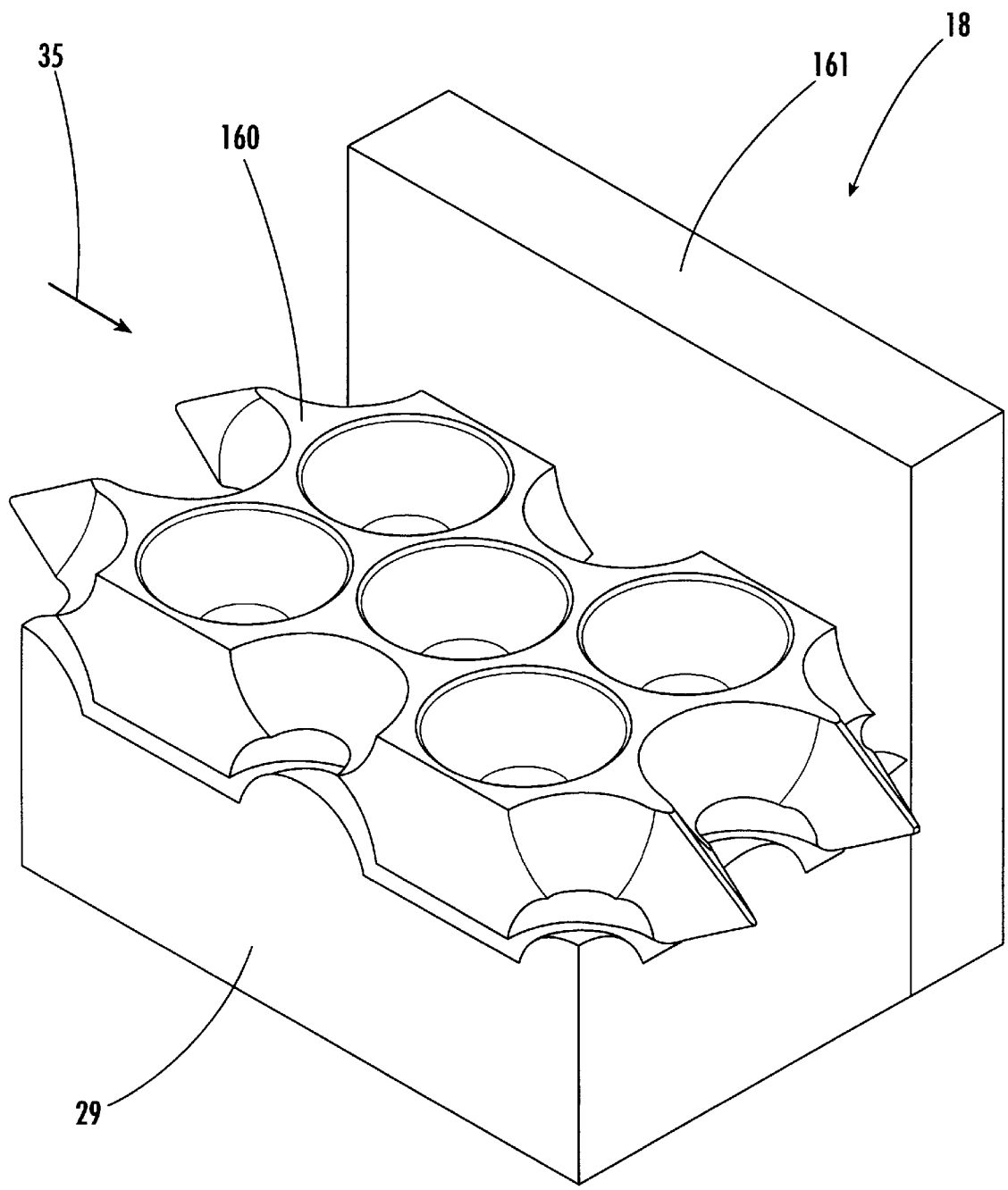
Figure 23:
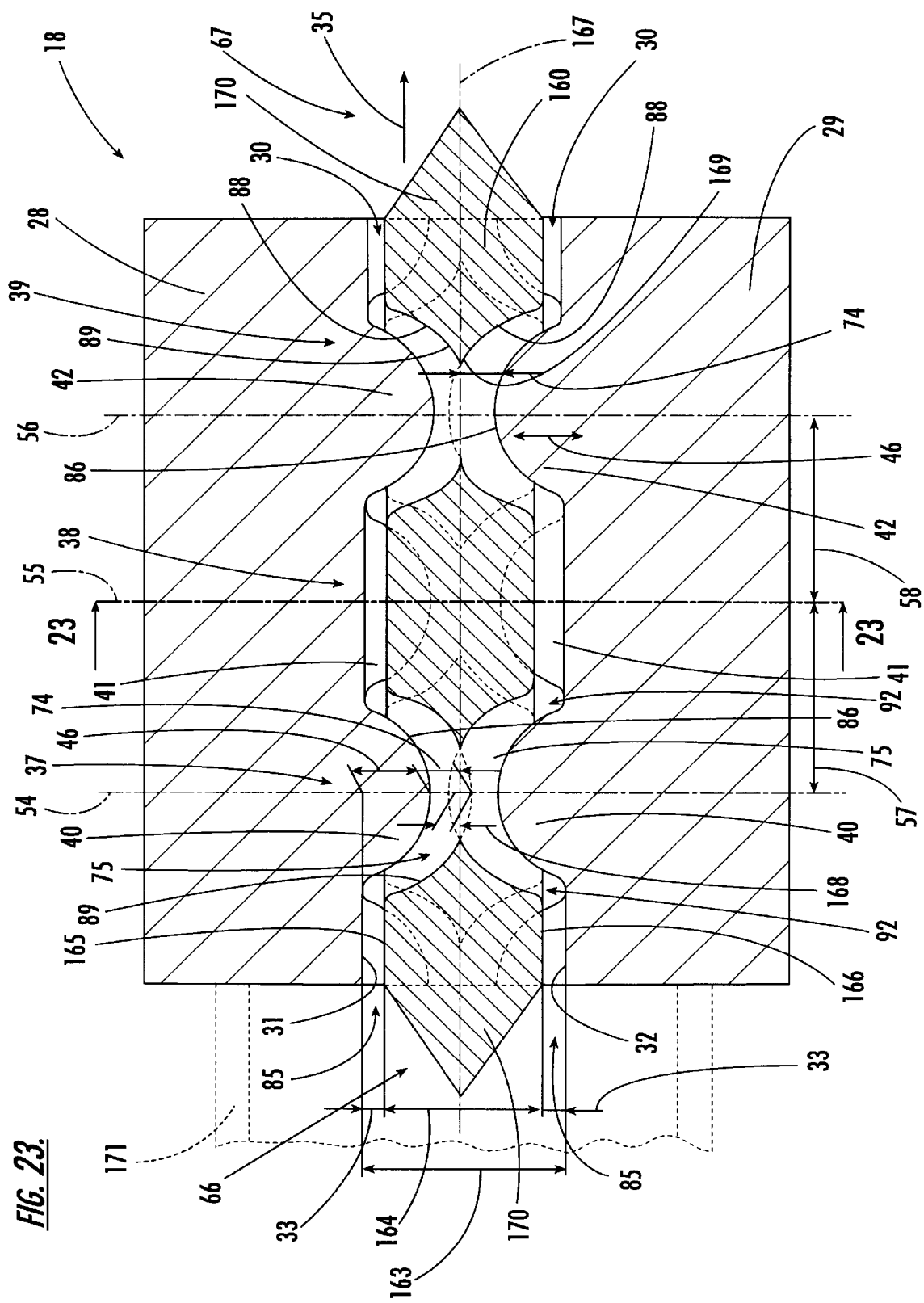
Figure 24:
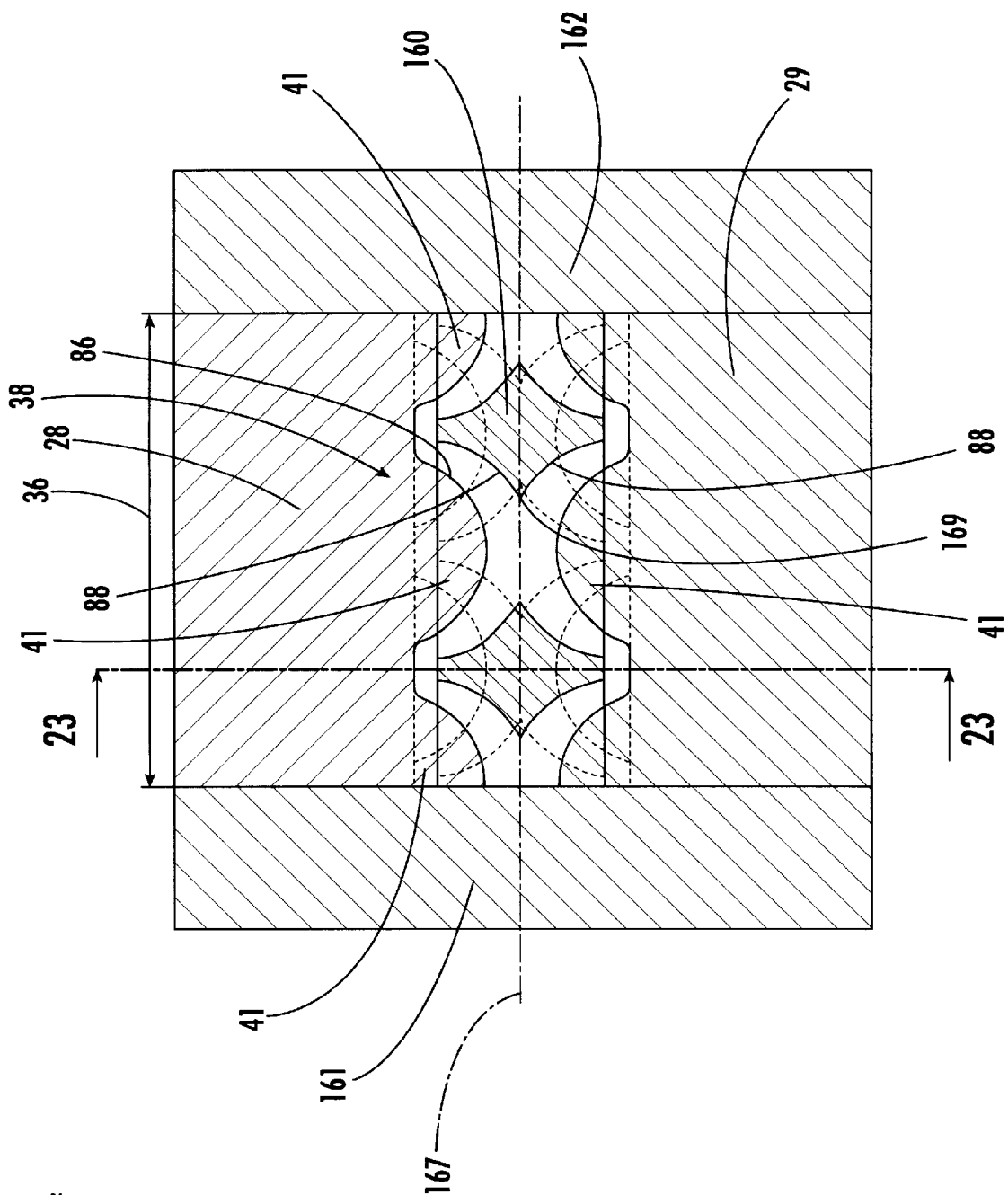
Figure 25:
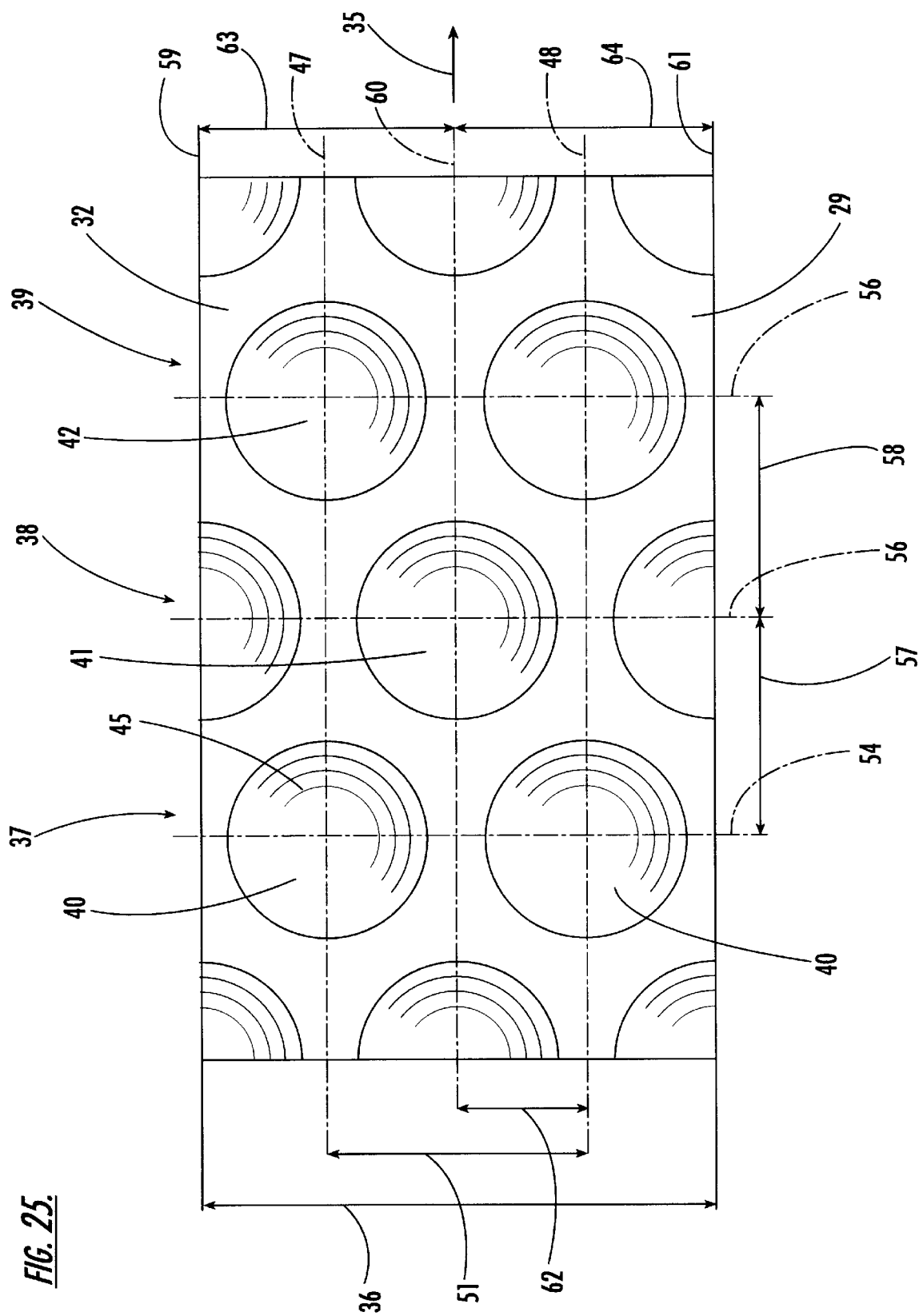
Figure 26:
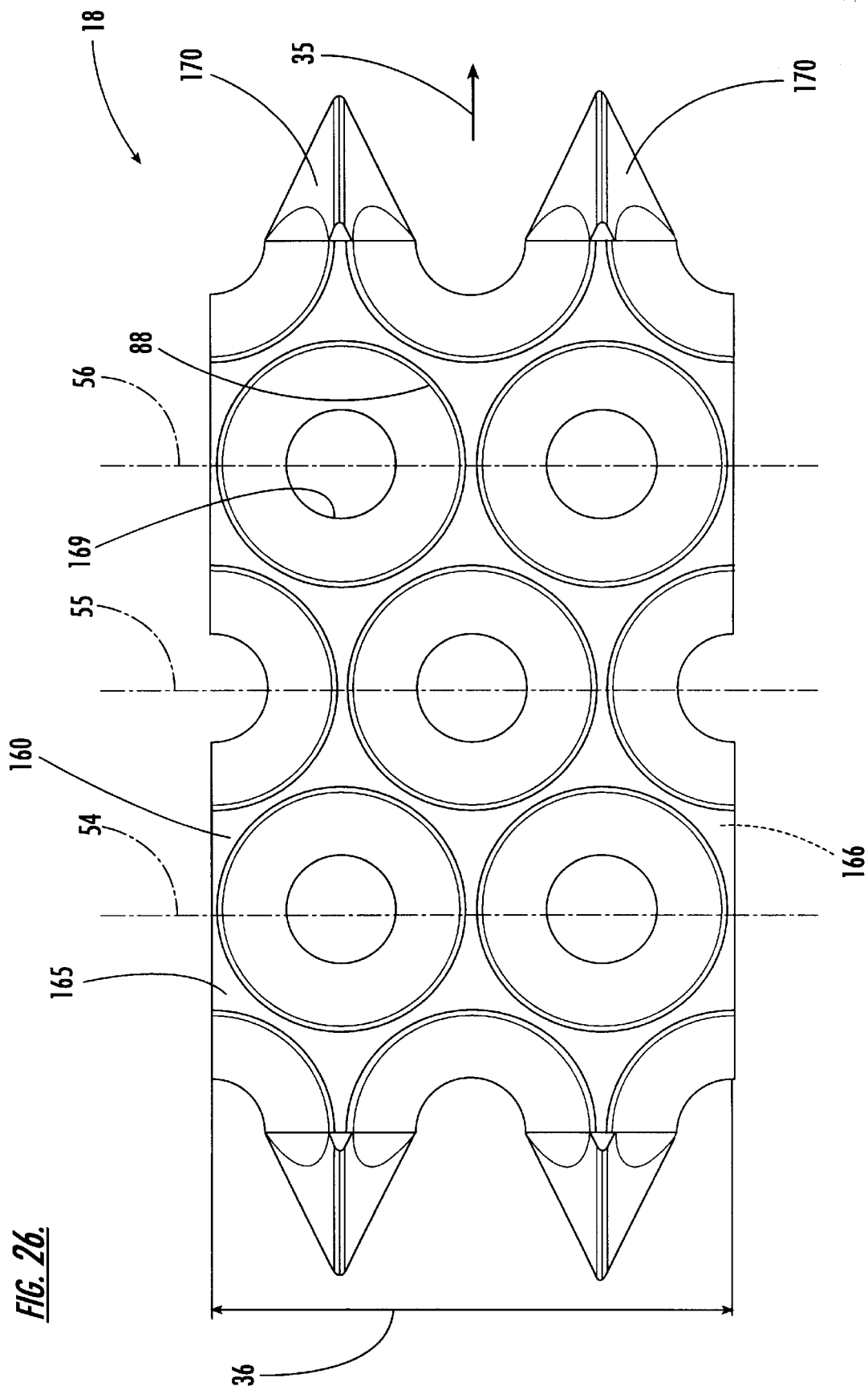
Figure 27:
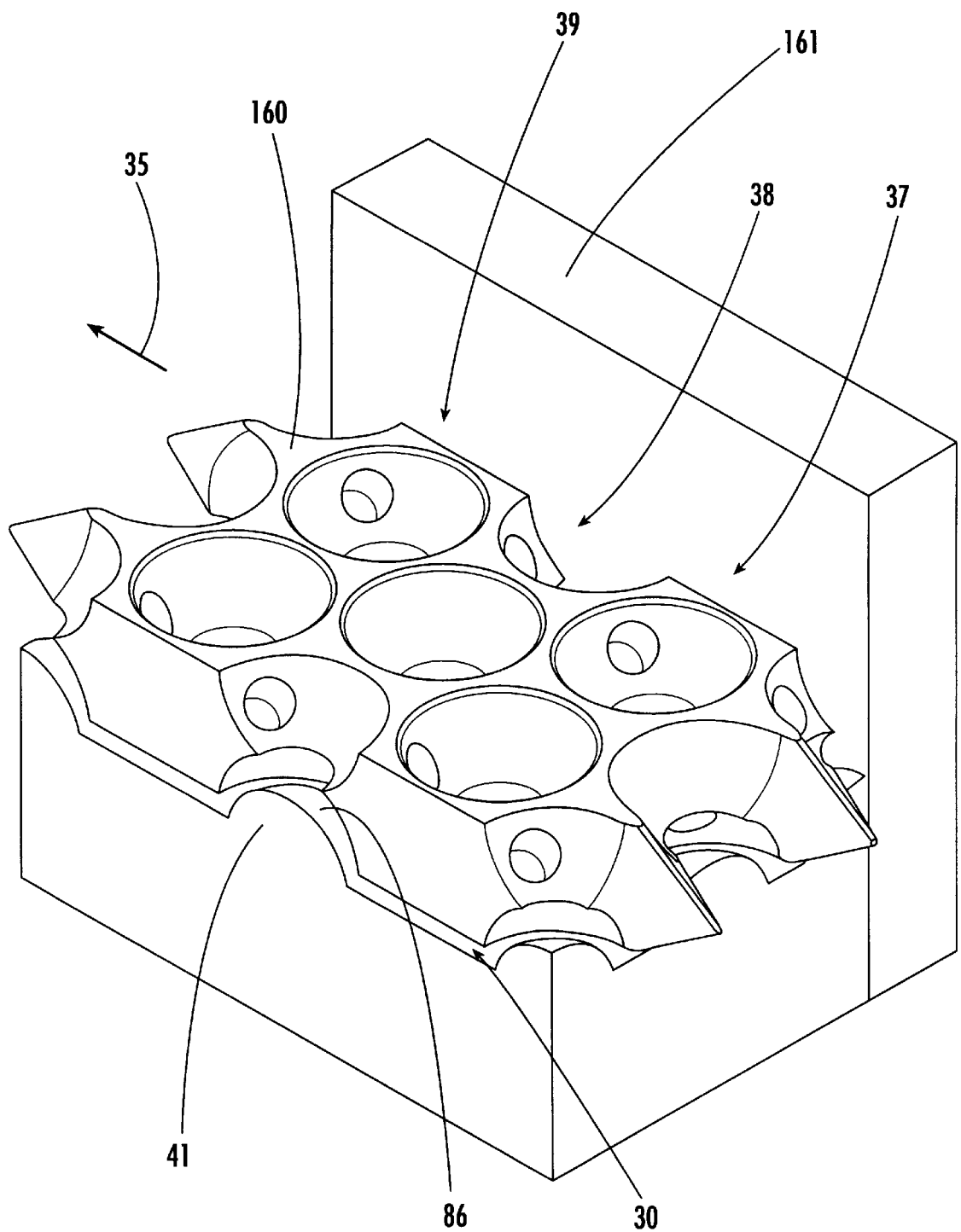
Figure 28:
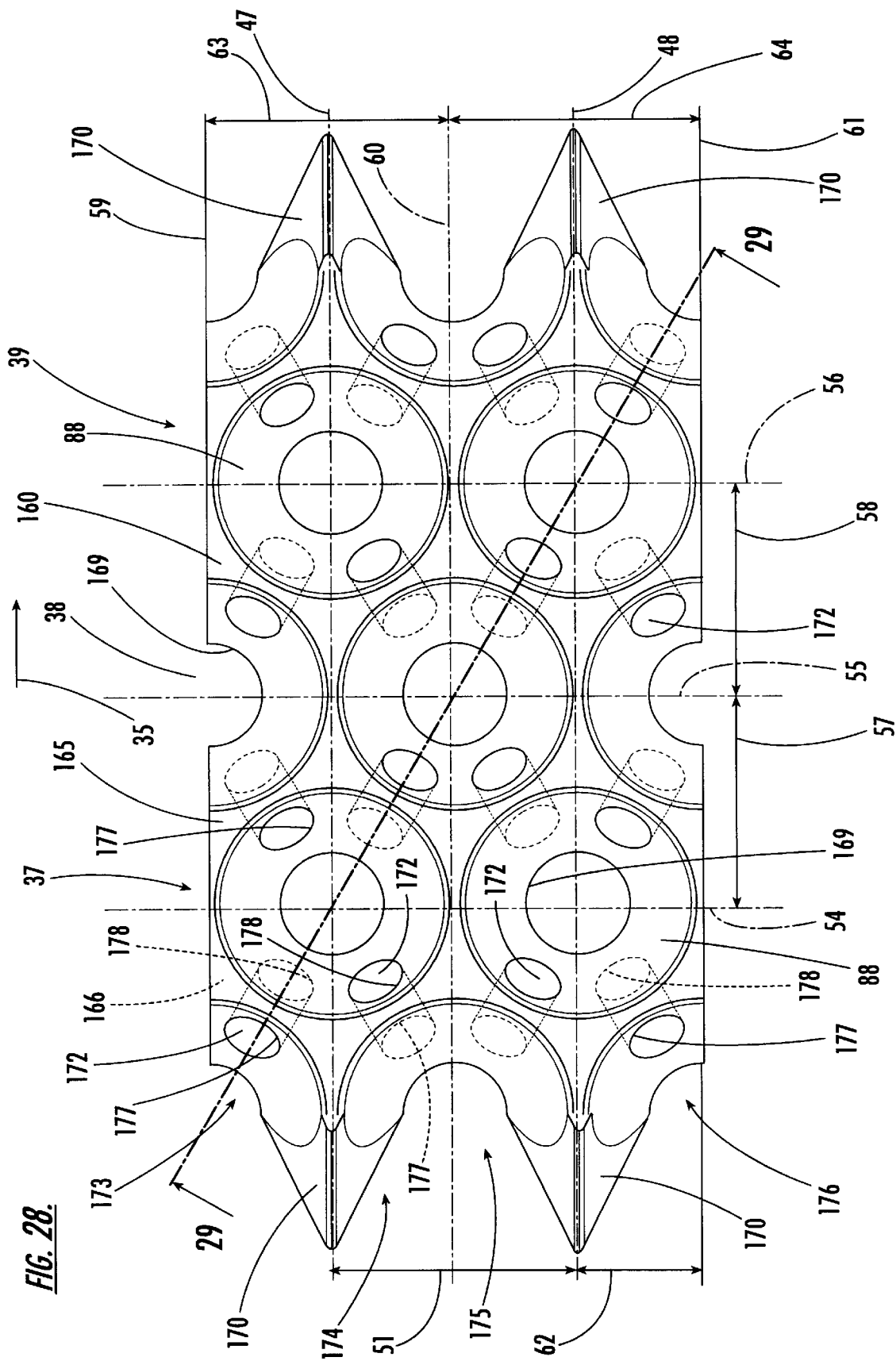
Figure 29:
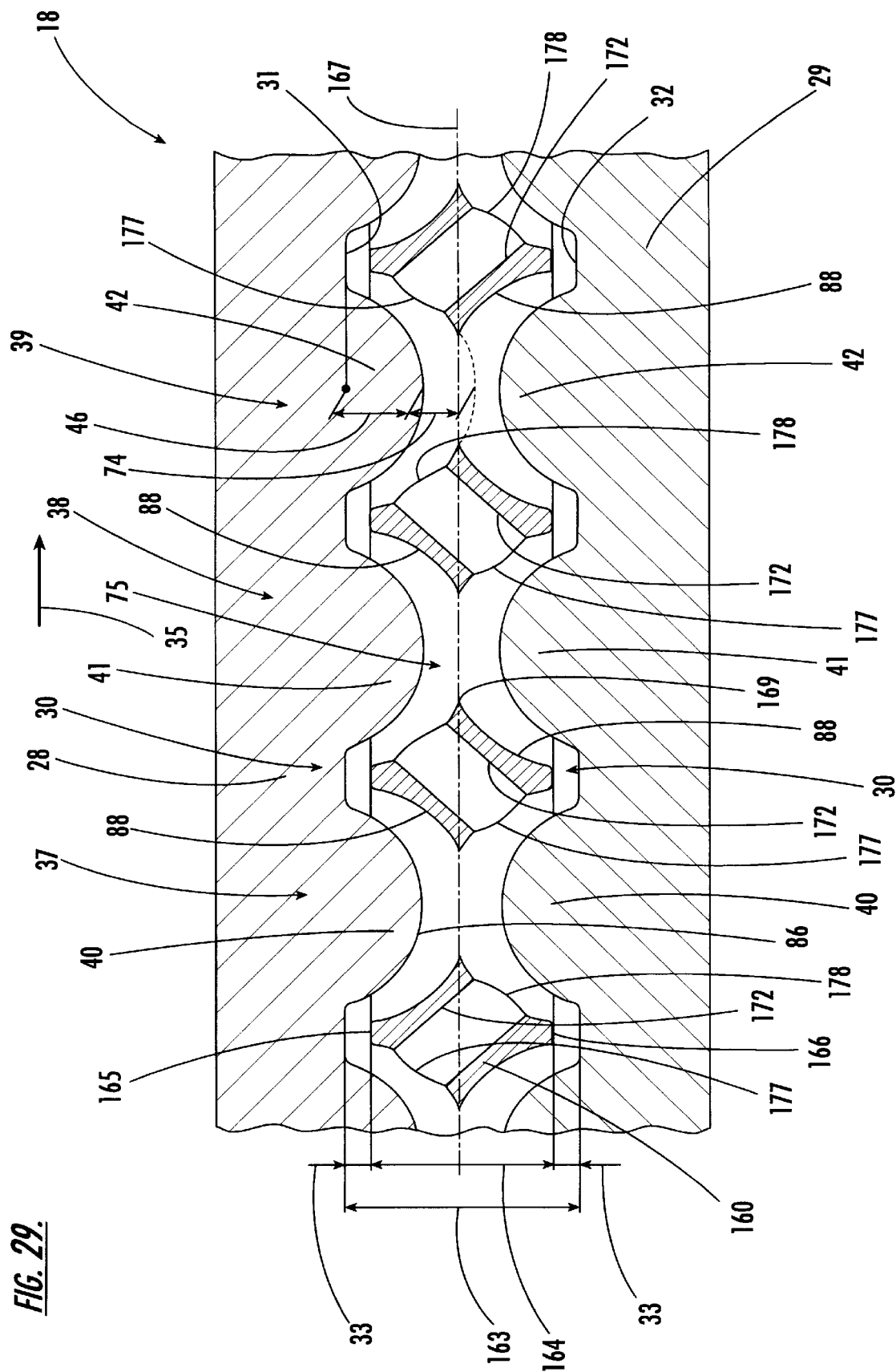

The invention is now explained in more detail in the following with reference to the various variant embodiments shown in the drawings and preferably independent in themselves. Shown are:

FIG. 1: an installation according to the invention for manufacturing molded parts by injection molding with a guide device disposed between the injector unit and the injection molding tool, shown in side view and in a simplified schematic illustration;

FIG. 2: another likewise independent installation according to the invention for manufacturing endless articles by the extrusion method with a guide device located within the extrusion tool, in side view and in a simplified schematic illustration;

FIG. 3: a further possible embodiment likewise independent in itself, of the guide device according to the invention during passage of the material of the layer, in a pictorial simplified view with the mold lid raised;

FIG. 4: the mold base part of the guide device according to the invention according to FIG. 3 in plan view;

FIG. 5: the mold lid of the guide device according to FIG. 3 in a view from below;

FIG. 6: the guide device according to FIGS. 3 to 5 in cross-section along lines VI—VI in FIG. 4;

FIG. 7: the guide device according to FIGS. 3 to 6 in cross-section along lines VII—VII in FIG. 4;

FIG. 8: a partial area of the guide device according to FIGS. 3 to 7 in simplified pictorial view and on a larger scale, in partial section;

FIG. 9: a further possible embodiment, likewise independent in itself, of a layer produceable with a guide device according to the invention, with the mold lid raised and the mold base of the guide device in simplified pictorial view;

FIG. 10: the mold base of the guide device for producing the layer according to FIG. 9, in plan view;

FIG. 11: a partial area of the guide device according to FIG. 10, in cross-section along the line XI—XI of FIG. 10;

FIG. 12: a further partial area of the guide device according to FIGS. 10 and 11, in cross section along the line XII—XII of FIG. 10;

FIG. 13: a transition zone between the deflector member and the recess in plan view, in section along line XIII—XIII of FIG. 11;

FIG. 14: the transition zone according to FIG. 13 with an altered flow cross-section between the deflector member and the recess in plan view, in section;

FIG. 15: the transition zone according to FIG. 13 with an altered, further possible passage cross-section between the deflector member and the recess in plan view, in section;

FIG. 16: a further variant embodiment, if necessary independent in itself, of the deflector member for altering the flow cross-section in plan view, in section;

FIG. 17: another and if necessary independent embodiment of the deflector member for altering the flow cross-section within the delay chambers in side view, in section according to line XVII—XVII in FIG. 10;

FIG. 18: a possible and if necessary independent embodiment of a position altering device between the mold lid and the mold base of a guide device in side view, in partial section and in simplified schematic view;

FIG. 19: a further possible and if necessary independent design of the guide device with different measurement sensors located therein in conjunction with a control device, in a simplified schematic view, in partial section;

FIG. 20: a further possible and if necessary independent embodiment of the guide device within a securing frame with heating and/or cooling members located therein, in front view, in partial section;

FIG. 21: a further and if necessary independent design of the mold base part of a guide device in plan view;

FIG. 22: another possible and if necessary independent embodiment of a guide device in a simplified pictorial view with the mold lid and side portion removed;

FIG. 23: the guide device according to FIG. 22 in side view, in cross-section along line XXIII—XXIII of FIG. 24;

FIG. 24: the guide device according to FIGS. 22 and 23, in elevation, in cross-section along line XXIV—XXIV of FIG. 23;

FIG. 25: the mold base part of the guide device according to FIGS. 22 to 24 in plan view;

FIG. 26: the intermediate plate of the guide device according to FIGS. 22 to 25 in plan view;

FIG. 27: a further and if necessary independent design of the guide device with additional connecting ducts in the intermediate plate in a simplified pictorial view, the mold lid and side portion being removed;

FIG. 28: the intermediate plate according to FIG. 27 in plan view;

FIG. 29: the intermediate plate according to FIGS. 27 and 28 inside the guide device, in side view, in cross-section along the line XXIX—XXIX of FIG. 28.

FIG. 1 shows a system 1 for manufacturing molded components 2, which are produced by the injection molding method by means of an injection molding machine 3 shown schematically. The injection molding machine 3 is formed from a machine bed 4, which is supported on a usually planar support surface 5, such for example as a factory floor. The injection molding machine 3 further comprises an injector unit 6 located on the machine bed 4 and a closing unit 7. As is to be seen from this simplified schematic view, the injector unit 6 is formed from a plasticising unit 8 and a preceding storage container 9 for a material 10 stored therein. In the plasticising unit 8 the material is heated and thus plasticised under pressure with the additional application of heat, such for example as by means of heating members 11 shown schematically.

The closure unit 7 comprises a schematically shown injection molding tool 12, in which there is located at least one mold cavity 13 for shaping the molded components 2, and a drive device 14 for the opening movement of the injection molding tool 12.

For use and control of the system 1 there is provided via a schematically shown control device 15 with various display or regulating and control members in a switchgear cabinet 16, which is for example free-standing next to the system 1, and likewise on the support surface 5. Via the individual operating and control members of the control device 15, all the process parameters can be transmitted to the injection molding machine 3 via a connecting line 17.

In this embodiment there is interposed at the end of the plasticising unit 8 of the injector unit 6 and in front of the entry into the injection molding tool 12 of the closing unit 7 a guide device 18, which adequately homogenises and/or heats and/or mixes the material 10 conveyed through a screw worm 19 before its entry into the mold cavity 13 of the injection molding tool 12. The precise design and the method of operation of the guide device 18 will be described in more detail in the following Figures.

In this condition, the material 10 can be termed a free-flowing fluid. The free-flowing fluid can be the plasticised melt of various plastic materials and natural materials, such for example as liquid raw materials and/or ingredients for manufacturing plastics, such for example as thermoplastics, duroplastics, elastoplastics or foamed plastics, e.g. of polyol, isocyanate, for manufacturing PU foams or paste-like or free-flowing elastomers or rubber mixtures. Also involved however may be paint, adhesives and all other free-flowing materials including even foodstuffs or their ingredients, which are paste-like or free-flowing at room temperature, and which require precise mixing or homogenization at temperature. The further processing of this fluid or material 10 can be effected by injecting, extruding, casting or filling.

FIG. 2 shows a further construction and arrangement of the guide device 18, independent in itself, in conjunction with another system 20, in turn the individual parts of the system only being shown schematically and the same reference numbers as those in FIG. 1 being used for identical parts.

The system 20 serves for producing endless articles 21 by means of an extrusion procedure, the system 20 comprising an extruder 22 with a plasticising unit 23 and following thereafter an extrusion tool 24, which are located and secured on a machine bed 25. The machine bed 25 is in turn supported on the support surface 5, which is for example formed by a factory floor. In a storage container 9 associated with the extruder 2, the material 10 to be processed, e.g. a granulate, a powder or the like is stored, which is conveyed via a conveyor worm screw 26 through the plasticising unit 23 in the direction of the extrusion tool 24 and is thus plasticised or rendered free-flowing. During passage of the material through the plasticising unit the said material is heated and plasticised in accordance with the inherent properties of the material 10, under pressure and if necessary with the application of heat, and, before emergence from the extrusion tool, is passed out of a nozzle lip 27 through the guide device 18, which is in this embodiment located directly at the extrusion tool 24. Passage of the material through the guide device 18 and its precise design and method of operation will be described in more detail in the following Figures.

It should be mentioned at this point that in connection with the system 20, which is for example formed by an extrusion system, all further devices or arrangements for calibration and if necessary cooling the article 21 emerging from the extrusion tool 24 known from prior art can be provided. Likewise, all known systems known from prior art can be used or combined with one another at will for the systems 1 or 20.

FIGS. 3 to 7 show an if necessary independent embodiment of the guide device 18, the views selected here being extremely schematic, simplified and out of dimensional proportion, in order better to illustrate and describe the method of operation of the guide device 18.

The guide device 18 consists of a mold lid 28 and a mold base 29, between which there is formed a flow duct 30 between two mold surfaces 31 and 32 facing one another and spaced apart from one another. The two mold surfaces 31 or 32 facing one another of the mold lid 28 or of the mold base 29 are located at a distance apart which is preferably adjustable or alterable, so that the free-flowing material 10 or free-flowing fluid brought into the guide device 18 forms a thickness 33 of a layer 34. An arrow schematically shows a conveyance direction 35 for the layer 34 of material 10, a width 36 of the layer 34 roughly corresponding to the width of the guide device 18 or of the mold lid 28 and mold base 29, and the width 36 being a multiple of the thickness 33. It is however also possible to mix or homogenise a plurality of different free-flowing materials or fluids within the guide device. These can be fed in in the same areas next to one another or at different points.

Located on the mold surface 32 of the mold base 29, in individual successive rows 37, 38, 39 in the conveyance direction 35, respectively transversely to the conveyance direction 35, are deflector members 40 to 42. In this embodiment the individual deflector members 40 to 42 are in the form of truncated cones, which have a calotte shell-shaped termination; it should be mentioned here that naturally any possible three-dimensional shape can be selected for the deflector members. These can for example be truncated pyramids, elliptical three-dimensional shapes, calotte shells or calotte sections. The three-dimensional shape of the deflector members 40 to 42 can however also have any other desired design, such for example as ellipsoids of revolution or rotational bodies formed by hyperbolas, parabolas or other curve shapes or parts of such curve shapes, in the case of surface curve shapes the three-dimensional shape of the deflector members can be produced by a rotation of these curves about an axis of symmetry.

The surfaces of these deflector members 40 to 42 are smooth and the convex surfaces are connected in all three-dimensional directions to the adjacent surfaces of the mold base 29 or of the mold lid 28 via sufficient roundings. It is also however possible to produce on the surface of these deflector members 40 to 42 further convex projections of the type of bosses or buttons or in any other optional form, in order, in addition to the various flow speeds achieved by the deflector members 40 to 42 to achieve a mixing of the fluid or to achieve an even greater surface for the heat transfer into the fluid or in the direction of the mold surfaces 31, 32.

The individual deflector members 40 to 42 in this embodiment are similarly designed in each of the individual rows 37 to 39 and have a base length 43 transverse to the conveyance direction 35 and a base length 44 in the conveyance direction 35, which are in this case of equal length. An upper area of a cover surface 45 of the individual deflector members 40 to 42, i.e. that which is spaced the furthest away from the mold surface 32 of the mold base 29, is located at a distance from the mold surface 32 at a height 46 starting from the mold surface 32 in the direction of the mold lid 28. Through the centre of the base surfaces or of the cover surfaces 45 of the deflector members 40 of row 37, there respectively extends a longitudinal plane 47 to 50 parallel to the conveyance direction 35 and vertical to the mold surfaces 31 or 32 of the guide device 18. The individual longitudinal planes 47 to 50 are located transversely to the conveyance direction 35 at a constant distance 51 to 53 from one another. The individual deflector members 40 of the first row 37, the deflector members 41 of the further row 38 and the deflector members 42 of the following row 39, are respectively located in transverse planes 54, 55, 56, the transverse planes 54 to 56 being disposed vertically to the longitudinal planes 47 to 50, i.e. transversely or vertically to the conveyance direction 35.

The individual transverse planes 54 to 56 are arranged at a spacing from one another in the conveyance direction 35 of distances 57 or 58.

As is to be seen from the view in particular of FIG. 4, the deflector members 40 and 42 of rows 37 or 39, seen in the conveyance direction, are located in the same longitudinal planes 47 to 50 and, seen in the conveyance direction 35 are spaced apart by the sum of the distances 57 and 58. The deflector members 41 of row 38 in the transverse plane 55 are located in their own longitudinal planes 59 to 61, which are aligned parallel to the longitudinal planes 47 to 50. The longitudinal planes 59 to 61 of deflector members 41 are offset to the longitudinal planes 47 to 50 by a degree of offsetting 62 relative thereto, which corresponds to the half of the distances 51 to 53. The individual longitudinal planes 59 to 61 are disposed relative to one another again at the same distances 63 or 64 transversely to the conveyance direction 35, which preferably correspond to the distances 51 to 53.

In dependence on the selection of the base lengths 43, 44 and of the individual distances 51 to 53 or 63 and 64 between the longitudinal planes 47 to 50 or 59 to 61 an overlap 65 results between the deflector members 40 of row 17 in the transverse plane 54 and the deflector members 41 of row 38 in the transverse plane 55. This dimension of the overlap 65 can be varied by the selection of distances 51 to 53 or 63 and 64 and of the base lengths 43 and 44 of the individual deflector members 40 to 42. It is further advantageous if the degree of offsetting 62 between the longitudinal planes 47 to 50 and the longitudinal planes 59 to 61 is identical and thus symmetrical, as in this way a uniform flow resistance is opposed to the travelling material 10 of the layer 34 in areas transversely adjacent to the conveyor direction.

In an entry area 66 of the layer 34 of the material 10 into the guide device 18, the latter has the width 36 and the thickness 33, so that the external dimensions of the volume flow are established. It is now a matter, starting from the entry area 66 through the guide device 18 to form for this volume flow of the layer 34 in such a way that, in an outlet area 67, the emerging volume flow in turn emerges totally uniformly from the guide device 18; the central factor is that within the guide device 18 the layer 34 is only spatially deformed and moved at varying speeds, yet never separated apart, thus e.g. not divided into individual flows. Due to the degree of offsetting 62 of row 38 relative to rows 37 and 39 with the deflector members 41 or 40 and 42, the volume flow of material 10 passing through respectively impinges, after flowing round a deflector member 40 of row 37, on a duct formed between two deflector members 41 of row 38.

This volume flow, after flowing through between the two deflector members 41 of row 38, in turn impinges on a subsequent deflector member 42 of row 39, so that the volume flow of the material 10 must in turn flow around the deflector member 42.

This can happen for example in such a way that a majority of the volume flow, beginning from a notional plane, is raised by the layer 34 in the direction of the cover surface 45 of the deflector members 40 to 42 and simultaneously flows laterally round the individual deflector members 40 to 42. The individual deflector members 40 to 42 guide the volume flow of material passing through in all spatial directions, i.e. the layer is raised relative to its thickness 33, and an offsetting transversely to the flow direction of the volume flow as well as a transport movement of the volume flow in the conveyance direction 35. The flow-round principle of the individual deflector members will be explained in more detail in one of the subsequent Figures.

Now in order better to be able to illustrate the passage of the material 10 through the guide device 18, the layer 34 is sub-divided transversely to the conveyance direction 35, i.e. in longitudinal extension of the individual transverse planes 54 to 56, notionally into individual part areas 68 to 73'.

As is now to be seen from the cross-sectional views of the guide device 18 in FIGS. 6 and 7, in FIG. 6 the volume flow of the material 10 is shown for the partial area 70, and in FIG. 7 the volume flow for the partial area 73.

FIG. 6 shows how the layer 34 of the volume flow enters into the flow duct 30, which in this area forms an inlet duct, and after a short flowing movement in the conveyance direction 35 impinges on the first deflector member 40 of row 37 in the transverse plane 54. Thus the volume flow of the material 10 predominantly flowing in the partial area 70 is transported onward in the direction of the cover surface 45 of the deflector member 40 and brought into a delay chamber 75 having a larger cross-section 74 or thickness in the vertical direction relative to the mold surface 32.

As is now shown schematically by arrows of different lengths, a flow speed in the entry area 66 as far as the deflector member 40 is greater than a flow speed in the delay chamber 75. After flowing round the deflector member 40, the material is in turn deflected in the direction of the mold surface 32 of the mold base 29, at that point passes into an acceleration duct 76 located between the deflector members 40 and 42 and having a smaller cross-section or thickness. Then the fluid or material 10 impinges on the further subsequent deflector member 42 in the transverse plane 56 of the roll 39 and flows around this in turn in the way described before, the material passing into a delay chamber 77 with a larger volume in turn with a slower flow speed, as is schematically shown by a shorter arrow. The flow speed within the acceleration channel 76 is higher for the partial area 70 of the volume flow of the material relative to flow speeds in the delay chambers 75 or 77.

Preferably, the acceleration duct 76 has a height 78 which corresponds to the thickness 33 of the layer 34 in the entry area 66. It is naturally of course also possible to form the acceleration channel 76 with different heights 78, in order to obtain a special flow behaviour. Thus it is advantageous if the height of the cross-section 74 comes to two to four times, preferably three times the height 78 or the thickness 33.

FIG. 7 shows the passage of the partial area 73 of the layer 34 through the guide device. The volume flow entering the entry area 66 first passes into an acceleration duct 79 and impinges on the first deflector member 41 only in the transverse plane 55. The flow-round and simultaneously therewith also the deflection of the volume flow of the layer 34 is carried out according to the details described in FIG. 6, yet only offset by the spacing 57 to the transverse plane 54. In the area of the deflector member 44 again there is located a delay chamber 80 with larger volume, in which the flow speed of the volume flow is lower than the flow speed in the acceleration duct 79.

If FIGS. 6 and 7 are considered together, it can be seen that the volume flow passing through per unit of time in the mutually-adjacent partial areas 68 to 73', observed over longitudinal sections 81,82 between the transverse planes 54 and 55 or 55 and 56, is in total of identical size. This means that the material 10 of the layer 34 passing through is exposed, in the individual part areas 68 to 73' during its passage through the guide device 18 to different flow speeds, and to deflections offset to one another in the conveyance direction. By means of these mutually-offset and differing flow speeds and differing cross-sectional planes, which extend through the transverse planes 54 to 56, a differing flow speed occurs in areas, which however in areas of lower flow speed are compensated by a greater cross-sectional area and in sections with a higher flow speed with a smaller cross-sectional area. Thus the volume flow of the material 10 per unit of time is approximately of the same magnitude in the mutually adjacent partial areas, with reference to the entry area 66 and the outlet area 67.

Furthermore, in this way the differing flow speeds of the material in the individual longitudinal sections in each partial area is established by the differing cross-sectional areas succeeding one another in the flow direction, i.e. the conveyance direction 35 of each of the partial areas 68 to 73'. In order to obtain good mixing or homogenization of the material 10 passing through inside the guide device 18, the layer 34 is deformed in successive longitudinal sections 81, 82 of the individual partial areas 68 to 73' in a direction extending parallel to the thickness 33 into sub-layers 83, 84 offset relative to one another by at least the dimension of the thickness 33. If now one considers the entire path of the individual partial areas 68 to 73' between the entry area 66 and the outlet area 67 of the guide device 18, the flow path covered or the flow path area, despite the spatial deformation, is approximately of the same size in the mutually adjacent partial areas 68 to 73'. In order to optimise the flow resistance of the material 10 during its passage through the flow duct 30 into the individual partial areas 68 to 73', it is advantageous if the thickness 33 of the layer 34, in the area of the spatial deformation with an increasing spacing from the mold surface 32, has a greater thickness or a greater cross-section 74 than in sections without spatial deformation.

In FIG. 7 the offsetting of the sub-layers 83 or 84 in the area of one of the deflecting members 41 is illustrated and described in more detail; it should be mentioned here that this naturally applies to all deflecting members 40 to 42. Thus the sub-layer 83 is located between the mold surfaces 31 or 32 of the mold lid 28 or mold base 29 and is mostly of a planar-flat shape. This sub-layer 83 of the layer 34 in this case has the thickness 33 and flows from the entry area 66 through an inlet duct 85 into the acceleration duct 79 located in the transverse plane 54 between the deflector members 40 of the first row 37, and at that point impinges on a deflector member 41 of row 38 in the transverse plane 55. As already described before, the deflector member 41 is here formed by a truncated conical part and a conical surface 86 of the deflector member 41 encloses an angle 87. In order to obtain a transition favourable to flow from the flat mold surface 32 of the mold base 29 to the surface 86 of the deflector member 41, this transition is rounded or concave. The cover surface 45 is in the form of a convex section, which can preferably be formed by a calotte shell, which terminates the surface 86, flat in this embodiment, in the area facing away from the mold surface 32.

Located in the mold lid 28, starting from the mold surface 31 and central to the deflector member 41 is a recess 88. This recess 88 is likewise in a truncated conical form, a conical inner surface 89 enclosing a conical angle or angle 90, which is preferably identical with or smaller than the cone angle or angle 87 of the deflector member 41. By means of this preferred angular difference between the cone angles or angles 87 and 90 and a greater depth 91 of the recess 88, which is made up of the cross-section 74 of the delay chamber 80, plus the height 46 of the deflector member 41 and minus the thickness 33 of height 78 of the layer 34 or of the acceleration duct 79, a transition zone 92 forms between the sub-layer 83 and the delay chamber 80 with larger cross-section. Thus the cross-section of the volume flow, seen in a parallel direction to the mold surfaces 31 or 32, with a spacing therefrom, increases in the direction of the delay chamber 80 between the surfaces 86 or inner surfaces 89 of the individual deflector members 41 or recesses 88. Due to this enlargement of cross-section with increasing spacing from the preferably flat sub-layer 83, there results for the sub-layer 84 in the region of the delay chamber 80 a spatial deformation of a dimension 93, which in this embodiment corresponds to the height 46 of the deflector member 41. This dimension 93 of the sub-layers 83 and 84 to one another corresponds at least to the larger part of the dimension of the thickness 33 of the layer 34 of the sub-layer 83 in the area of the inlet duct 85, but however can also come to a multiple of this thickness 33, i.e. between one and five times, preferably two and three times the thickness 33 of the sub-layer 83. A transition of the inner surfaces 89 of the recess 88 is provided by a concave base surface 94, which can for example be formed by a calotte shell or rotarily symmetrical section of ellipses or parabolas. Naturally, all possible three-dimensional shapes may be envisaged for forming the convex cover surface 45 or concave base surface 94 or recess 88, as quoted for example initially for the deflector members 40 to 42.

This spatial deformation of the layer 34 is best seen from FIG. 3, which illustrates a simplified perspective view of the volume flow of the material 10 located on the mold base 29, with the mold lid 28 raised. Thus the offsetting of the individual deflector members 40 to 42 in rows 37 to 39 and the flow around the individual deflector members 40 to 42 are shown.

FIG. 8 shows schematically the flow around one of the deflector members, in the present embodiment that for deflector member 40, whereby with increasing spacing from the mold surface 32, the reduction in the flow speed of the material 10 or fluid, starting from the sub-layer 83 to the sub-layer 84 in the delay chamber 80 is shown schematically by increasingly shorter arrows. Due to this perspective half-section view it can also be seen that the flow around the deflector member 44 takes place both in the circumferential direction of the same and in the direction of the delay chamber 80, so that as the flow approaches the deflector member 40 a delay in speed occurs and, after flowing through or reaching the transverse plane 54, an increase in the flow speed of the volume flow occurs due to the constriction of the flow cross-section. Furthermore, dotted lines show individual volume flows which move forward along the surface 86 of the deflector member 40 and, depending on reaching planes 95 to 98 offset in height to one another, in the direction of the height 46 the flow speed alters according to the arrows entered in the planes 95 to 98, the arrows respectively becoming shorter indicating a lower flow speed. The flow speed reduces to a minimum in the delay chamber 80 or in all delay chambers 75 and 77. This reduction in the speed of the volume flow during flow around the deflector member 40 may not fall below a certain minimum, as this can lead to stoppage of the volume flow and this would have the consequence of thermal destruction of the material 10.

If one considers in combination FIGS. 3 to 7, with the passage of the volume flow for the partial area 72, those mass components which are located in the area of the longitudinal plane 49, are preferably raised into the delay chamber 75. Those sections of the volume flow of the partial area 72, which are located nearer to the partial areas 71 and 73 adjacent thereto, rather flow laterally round the deflector member 40 and are only partly raised in the direction of the height 46 of the deflector member 40. The two volume flows 71 and 73, which are adjacent to the volume flow of the partial area 72, are offset likewise in the sections facing the partial area 72 in the direction of the height 46 of the deflector member 40, and only those sections of the partial areas 71 and 73, which flow through the guide device 18 in the area of the longitudinal planes 60 and 61, pass through the acceleration duct 79.

Due to this lateral flow-round and individual offsettings of the sub-layers 83 and 84 relative to one another, and to the resultant speed differences, good homogenization of the material 10 flowing through is achieved within the guide device 18.

During division of the individual rows 37 to 39 of the deflector members 40 to 42 in the conveyance direction 35, it is advantageous if deflector members 40 and 41, located directly one behind the other, of rows 37 and 38 are alternatively offset to one another in the conveyance direction 35, and the sum of the different rows 37 and 38 located one behind the other is an even number. The row 39 with its transverse plane 56 is thus similarly formed to the row 37 with the transverse plane 54. The offsetting and arrangement of the various rows 37 and 38 is provided within the guide device in the conveyance direction 35 in accordance with their overall number.

The mixing and/or thermal homogenization of the free-flowing fluid or the material 10 now takes place as follows:

The free-flowing fluid, e.g. a plasticised thermoplastic, duroplast or free-flowing raw material for manufacturing soft, medium hard or hard plastic foams, such for example as polyurethane, polyether or the like, is preferably deformed to a layer whose width corresponds to a multiple of the thickness 33, and thereafter is internally mixed or admixed and if necessary simultaneously thermally homogenised during the forward movement in the flow direction or conveyance direction 35. Thus it is additionally also possible for the dimensions of the layer 34 as regard thickness 33 and width 36 during mixing and homogenization to be altered, in particular the width 36 being enlarged and if necessary a thickness 33 being reduced.

This mixing occurs in such a way that the material 10 is moved at differing speeds in the individual sub-layers, lying one above the other, of the layer 34, e.g. in accordance with the planes 95 to 98 offset to one another in height, as are shown in FIG. 8. In this way there occurs a relative displacement of the portions of the material moved in these laminar flows or layers, at least in the flow or conveyance direction 35, but also in all other three-dimensional directions, as the individual portions of the material mutually overtake one another or push above or beneath one another, and thus total mixing is achieved.

This mixing is reinforced by the fact that the layer 34, in successive longitudinal sections, is deformed during the continuously diametrically opposed deformation in a direction extending parallel to the thickness 33 at least by the largest part of the dimension of the thickness 33 of the layer 34 on sub-layers 83,84 constantly offset to one another. Thus in areas succeeding one another in the flow or conveyance direction 35, those portions of the fluid or material 10, which have been moved passed a mold surface 31, 32 or a recess 88 or a deflector member 40 to 42, are displaced in directly subsequent areas in the central region of the thickness 33 of the layer 34 and other sub-layers of the layer 34, advancing from the central region, thereafter come into contact with the mold surfaces 31, 32 or the surfaces of the deflector members 40 to 42 or the recesses 88.

Due to the good admixture thus obtained it is also ensured that if one considers the layer 34 to be treated as notionally made up of a plurality of individual laminar flow skeins, during treatment of the layer 34 each of these laminar schemes comes into contact with the mold surfaces 31, 32 or the surface of the recesses 88 or deflector members 40 to 42, so that, depending on the thermal conditions required, the fluid or material 10 can be brought into certain thermal conditions by the application or removal of energy. Thus it is advantageous for a uniform throughput of the layer 34 to be treated over its entire cross-sectional surface, if a length of the flow paths between the cross-sectional planes succeeding one another directly in the flow dire s different or variable. A speed compensation of the proportions of fluid or material 10 moved at differing speeds can again be achieved over the differing length of the flow paths in mutually-adjacent partial areas 68 to 73', so that above all the pressure drop over the entire cross-sectional area of the layer 34 before the start and after the start of the treatment can be kept equal, or by alteration can be adapted to desired values, or can be co-ordinated with one another in the partial areas 68 to 73' extending parallel to one another.

Above all when the object is to produce in addition a thermal homogenization of the fluid or material 10, it is advantageous to take note during treatment of the layer 34, that the flow path surface in mutually-adjacent partial areas 68 to 73' of the layer 34 is roughly identically large between the beginning and the end of the treatment, so that the application of temperature and the thermal homogenization is of equal magnitude over the entire cross-sectional area of the layer 34 after the treatment.

The duration time of the fluid or material 10 in the layer 34 can be established or also adjusted by the pressure drop between the area in front of the spatial deformation and the area after the spatial deformation, and normally the pressure in the fluid or material 10 in the area in front of the deformation is higher than in the area after the spatial deformation.

An improved mixing of the individual portions of the fluid or material 10, notionally termed laminar flow skeins, not only in the flow or conveyance direction 35, but also in directions extending transversely thereto, is achieved if the layer 34 in a cross-sectional plane in the mutually-adjacent partial areas is in a direction extending parallel to the thickness 33, is offset at least by the largest part of the dimension of the thickness 33 in the direction of the thickness 33, and has a differing thickness 33 in these adjacent areas.

Above all, adaptation of the pressure drop in the fluid or material 10 or its monitoring or adaptation of the temperature and obtaining a homogeneous temperature curve in the entire fluid or material 10 can be achieved within this process if the pressure and/or the temperature are determined at least in the area before the treatment and immediately after the treatment of the layer 34, and an adjustment or intermittent or continuous monitoring and alteration in the sense of a regulating procedure is undertaken to maintain the pressures and temperatures within certain threshold areas according to predeterminable threshold areas by comparison of the pressures and temperatures respectively detected with these boundary areas. If the fluid or material 10 changes its cross-sectional dimensions also during treatment of the layer 35, it can prove advantageous to monitor the deformation speed or the deformation paths likewise via the established values of pressure and temperature of the layer 34, and if necessary to control or regulate these. There is to be respectively understood by this that this control can be effected in that, in design and setting the frame conditions in treating the layer 34, by means of monitoring the values obtained and undertaking an adjustment at the beginning of the processing procedures of the layer 34, fixed adjustment can be undertaken or self-regulating systems can be provided, which undertake a continuous adaptation of the deformation of the layers 34 or can influence the temperature during the course of the operation, i.e. during treatment of the layer, in order to be able to maintain desired threshold values throughout the operation. In this way it is also possible to compensate for certain deviations and fluctuations in the quality of the raw material and the like.

Also, in order to obtain a homogenous temperature distribution over the entire cross-section of the fluid or material 10, it can be advantageous if determination of the temperature and/or of the pressure is carried out distributed in the most varied areas and sub-layers of the layer 34 over the surface. During the method it is also possible to treat individual partial areas of the layer 34 linearly or three-dimensionally by the application of vibrations; this vibrational treatment and if necessary the squeezing actions thus effected on the fluid or material 10 can be used both to alter the temperature and to obtain better mixing. In the case of frequencies of less than 30 Hz, this mainly serves to improve mixing of the individual proportions of the fluid or material 10. At higher frequencies, above all in the range above 1 MHz or 1 GHz i.e. vibrations which are identified as ultrasound or microvibrations, these can be used, in addition to providing improved mixing, or also independently thereof above all for short-term temperature increase of the mass as a result of the vibratory excitation.

Above all, by virtue of the fact that the entire layer 34 is cohesively subjected to displacement of the individual notional laminar flow skeins, without these being divided into spatially separated partial skeins, tension zones in the layer 34, such for example as result in the case of hole or ring torpedoes during subsequent combination after passing through the same in the area of the so-called weld seams, are avoided, and homogenous, particularly crack-free components may be produced from such layers 34.

Naturally, this layer 34 at the outlet from the mold or in the case of injection molding machines in the mold, can adopt any optional three-dimensional shape and it is also possible to form this layer 34 before and/or during its treatment into various three-dimensional shapes, e.g. into cylindrical shapes for producing pipes or other shapes or manufacturing for example window profiles or other profiles of plastic.

Thus treatment of the layer can be effected in its own areas between plastification and shaping or during shaping or during introduction into a mold, e.g. in the case of injection molding machines or casting machines.

In FIGS. 9 to 12 a further if necessary independent embodiment of the guide device 18 is shown, the same reference numbers as in the preceding FIGS. 3 to 8 being used for identical parts.

The guide device 18 consists of the mold lid 28 and the mold base 29, which have the facing mold surfaces 31 or 32 and are located at a spacing apart from one another. In this way the flow duct 30 is formed between these two mold surfaces 31 and 32 which are spaced apart. This spacing of the two mold surfaces 31 or 32 from one another may be previously adjustable or variable, so that the free-flowing material 10 introduced into the guide device 18 forms the thickness 33 for layer 34. An arrow again indicates schematically the conveyance direction 35 for the layer 34 of the material 10, the width 36 of the layer 34 coming roughly to the width of the guide device 18 or of the mold lid 28 and mold base 29, and this coming to a multiple of the thickness 33.

In this embodiment, both on the mold surface 31 of the mold lid 28 and also on the mold surface 32 of the mold base 29, there are rows 37 to 39, offset to one another in the conveyance direction 35, with the deflector members 40 to 42 or recesses 88.

The shape of the deflector members 40 to 42 here corresponds to the shape of a calotte shell or also to a hemisphere, which by means of transitional radii is rounded in the direction of the two mold surfaces 31 or 32. This rounding serves to obtain a tangential approach flow of the volume flow to the respective deflector members 40 to 42. Otherwise the arrangement of the individual deflector members 40 to 42 basically corresponds to the arrangement previously described in FIGS. 3 to 8, a detailed description of which will be omitted here.

In the transverse plane 54, extending transversely to the conveyance direction 35 and vertically to the mold surfaces 31 or 32, of the first row 37, the deflector members 40 are respectively located in the longitudinal planes 47 to 50, aligned parallel to the conveyance direction 35 and vertically to the mold surfaces 31 or 32, on the mold surface 32 of the mold base 29. The recesses 88 are located in the mold surface 32 of the mold base 29, and the deflector members 41 are located on the mold surface 31 in the row 38 following the row 37 in the conveyance direction 35, in the plane 55, parallel to the transverse plane 54, which is offset thereto in the conveyance direction 35 by the spacing 57. There project into these recesses 88 the deflector members 41, which are located on the mold surface 31 of the mold lid 28 concentric with the recesses 88 thereon. The row 39 of deflector members 42 following row 38 is located in the transverse plane 56 aligned parallel to the transverse plane 55 by the spacing 58. The row 39 of the deflector members 42 or the recesses 88 associated therewith correspond in their shape, arrangement and design to row 37. The deflector members 41 or recesses 88 of the row 38 are located in their own longitudinal planes 59 to 61 extending parallel to the longitudinal planes 47 to 50, the degree of offsetting 62 between the longitudinal planes 47 to 50 and the longitudinal planes 59 to 61 preferably corresponding to half the distances 51 to 53 between the longitudinal planes 47 to 50. The longitudinal planes 59 to 61 are located transversely to the conveyance direction 35 and spaced apart from one another by the distances 63 or 64.

It is essential in selection of the distances 51 to 53 or 63 and 64 and the spacing 57 and 58 between the longitudinal planes or rows, that a rectilinear continuous duct is formed from the entry area 66 to the outlet area 67 of the guide device 18, between the rows, located one behind the other and offset to one another, of the individual deflector members 40 to 42 or recesses 88.

Due to the offsetting 62 between the rows 37 and 38 and the selection of base lengths 43 or 44 of the deflector members 40 to 42, the covering 65 is to be produced between these, so that a rectilinear passage of the volume flow through the guide device 18 is reliably avoided. This dimension of the covering can be varied by the selection of the distances 51 to 53 or 63 and 64 and of the base lengths 43 and 44 of the individual deflector members 40 to 42. It is also advantageous if the degree of offsetting 62 between the longitudinal planes 47 to 50 and the longitudinal planes 59 to 61 is selected to be identical and thus symmetrical, as in this way a uniform flow resistance is opposed to the material 10 of the passage 34 flowing through. In order here better to illustrate the passage of the material 10 through the guide device 18, seen over the entire width, the layer 34 is divided, transversely to the conveyance direction 35, i.e. in longitudinal extension of the individual transverse planes 54 to 56, into individual notional part areas 68 to 73'. In this respect it should be mentioned that these individual part areas 68 to 73' merely represent imaginary sections, and the entire volume flow of the material 10 of the layer 34, during its passage through the guide device 18, is merely spatially deformed and moved at varying speeds, yet is never separated apart such for example as into individual flows. From consideration of FIG. 9 and 11 and 12 together, the alternating displacement of the layer 34 of the spatial deformation thereof, starting from the sub-layer 83 between the mold surfaces 31 and 32 to the layer 84 is best seen.

In FIG. 11 there is shown the passage of the volume flow for the partial area 70 and in FIG. 12 for the partial area 73. The volume flow of the partial area 70 passes, starting from the entry area 66 of the guide device 18, into the inlet duct 85 of the flow duct 30. The preferably flat sub-layer 83 forms in the inlet duct 85 and, when it impinges on the first deflector 40 in the row 37, is deflected and flows around the latter in the manner described above.

The deflector members 40 to 42 have the height 46, starting from the mold surfaces 32 or 31 of the mold base 29 or mold lid 28. Due to the rounded transition between the mold surfaces 31 or 32 and the deflector members 40 to 42 towards their surfaces 86, there results a flow-favouring formation for the volume flow, in order to reinforce the flow behaviour within the flow duct 30 and the entailed homogenization of the material 10. In the inlet duct 85, the layer 34 has the thickness 33, which reduces continuously with an increasing spacing from the mold surfaces 32 or 31 in the direction of the height 46 of the deflector members 40 to 42, seen across the cross-section. The sub-layer 84, offset to sub-layer 83 in the delay chamber 75 is defined in the mold lid 28 by the recess 88, the inner surface 89 of the recess 88 in this embodiment being formed by a section of a portion of an ellipse of an envelope surface generated by rotation around one of the semiaxis. Naturally, any other possible three-dimensional shapes may be envisaged, such for example as sections of envelope surfaces of rotating parabolas, hyperbolas or other concave of convex linear forms. These different three-dimensional shapes can however also be used for the deflector members 40 to 42, or may be combined together in various ways. The delay chamber 75, relative to the thickness 33 of the sub-layer 83 has the greater cross-section 74, which comes to two to four times, preferably three times the thickness 33.

After the volume flow passes through the transverse plane 54, the cross-section of the flow duct 30 reduces continuously, passing into the acceleration duct 76 between the deflector members 40 and 42. In this acceleration duct 76 the volume flow of the partial area 70 is increased with respect to its flow speed and upon renewed impingement on the deflector member 42 of row 39, is again correspondingly deflected and decelerated, as already described with respect to deflector member 40. The offsetting of the sub-layer 84 relative to the sub-layer 83 in the delay chamber 75 or 77 by the dimension 93 thus corresponds to the height 46 between the mold surface 32 and the cover surface 45 of the deflector member 40, 42.

FIG. 12 shows the volume flow for the partial area 73, in this case the layer 34 being deflected only in the row 38 in the transverse plane 55 diametrically opposite the deflections in the rows 37 to 39. After the volume flow enters the entry area 66, the layer 34 passes through the inlet duct 85 directly into the acceleration duct 79, and impinges on the first deflector member 41 of row 38 only in the transverse plane 55. This deflector member 41 is located on the mold surface 31 of the mold lid 28 and projects into the recess 88 in the mold surface 32 of the mold base 29. Due to the offsetting of the individual rows to one another and the diametrically-opposed deflection in a wave shape, an even better homogenization result is achieved for the volume flow of the material 10 or of the mass passing through.

In this embodiment also, the course of the method in treatment of the layer 34 corresponds to the statements made with respect to the first embodiment in FIGS. 3 to 8.

The difference between these two variant embodiments resides only in the fact that in the present embodiment the deflector members 41 are formed by calotte shell sections, the associated recesses 88 being formed by sections of an ellipsoid of revolution, in which the smaller semiaxis is greater than the greater radius of the calotte shell section of the associated deflector member 41 and its large semiaxis is longer than a height 46 of the deflector members 41, 42.

Whereas the length of the smaller semiaxis of the section of an ellipsoid of rotation forming the recess 88 is established at twice the thickness 33 of the layer 34 in the flow duct 30 for preference, the length of the large semiaxis is three to five times, preferably two to four times the thickness of the layer 34 in the flow duct 30 greater than the height 46 of the deflector members 41, 42, so that there is available a flow cross-section, at a greater spacing from the flow duct 30, for the partial quantity of fluid or material 10 moving in this area with a lower speed. Contrary to this, this enlarged cross-sectional area between the deflector member and the recess in formation of the deflector members 41, 42 as truncated cones is achieved in that an outside diameter of the truncated cone or the recess 88 is greater than an outside diameter of the associated deflector member 40, 42.

The adjustment of the deflector members 40 to 42 relative to the mold surface 31, 32 or to the mold base 29 and/or the mold lid 28 can be effected by a preferably remotely-controlled adjustment drive, which is controlled via the control device, if necessary in dependence on the pressure and temperature values detected in the area immediately before and/or after the spatial deformation, or over the area of the spatial deformation.

The vibratory drives connected to the mold base 29 and/or mold lid 28, which generate movements preferably in a vibratory direction aligned vertically to the mold surfaces 31, 32, can be operated at a vibratory frequency of less than 10 Hz or with a vibratory frequency of greater than 1 MHz or 1 GHz.

In the vibration range with lower frequencies, principally the transport or mixing and homogenization of the fluid or material 10 by squeezing movements of the same is reinforced, whilst when using vibration amplitudes above 1 MHz, i.e. so-called ultrasonic vibrations or microwaves, these can be used for short-term energy application, particularly temperature increase of the fluid or material 10.

Such a short-term energy supply to the fluid or material 10, can prove particularly advantageous above all with elastomers.

In FIGS. 13 to 16, with reference to a deflector member 42, which projects into the recess 88, it is shown that in the area of the mold surface 31 with a concentric position of the deflector member 42 to the recess 88, an annular cross-section is formed for the beginning of the transition zone 92 towards the delay chamber 77. In this area the deflector member 42 has an outer diameter 99 and the recess 88 an inner diameter 100, the difference in diameters between the inner diameter 100 and the outer diameter 99 corresponding roughly to twice the thickness 33 of the layer 34. This uniform annular cross-section between the surface 86 of the deflector member 42 and the inner surface 89 of the recess 88 is only provided in a static or concentric position between the mold lid 28 and the mold base 29.

In order to achieve an even better mixing or kneading of the material 10 passing through the guide device 18, both parts of the mold, i.e. the mold lid 28 and the mold base 29 can be displaced relative to one another in their position parallel to their mold surfaces 31 or 32. This offsetting is dependent on the selected external shape of the deflector members 40 to 42 or the hollow form of the recesses 88 and can be effected, starting from the concentric position in each direction parallel to the mold surfaces 31 or 32 by half the diameter difference of the inner diameter 100 minus the outer diameter 99.

FIG. 14 shows by way of example an eccentric arrangement of the deflector member 42 in relation to the recess 88, the alteration in the annular cross-section being effected in the conveyance direction 35. Thus either the mold lid 28 or the mold base 29 can be in the form of a stationary part, and the respective other can be changed in position relative to the fixed part. Naturally, a mutual movement towards one another of the mold lid 28 to the mold base 29 is also possible. In the embodiment shown in FIG. 14 the positional alteration is indicated schematically by a double arrow 101 in the conveyance direction 35, the material 10 being correspondingly kneaded or displaced through the varying annular cross-section. Thus the cross-sectional area of the transition zone 92 between the two sub-layers 83 or 84 of the layer 34, offset to one another in the direction of the thickness 33, are altered at intervals, particularly intermittently.

FIG. 15 shows another and if necessary independent embodiment for the position alteration of the deflector member 42 with respect to the recess 88 by means of a schematically-drawn double arrow 102, this position alteration taking place transversely to the conveyance direction 35, i.e. in the direction of the transverse planes 54 to 56. Due to this lateral movement or transverse movement to the conveyance direction 35 there can be imparted to the material 10 flowing through an additional transverse movement relative to the conveyance direction 35, in order to obtain a better distribution of the passing volume flow over the entire width 36 of the guide device 18, starting from its central area towards the lateral areas.

In FIG. 16, on the other hand, there is shown a further and if necessary independent solution for the relative movement of the mold lid 28 relative to the mold base 29 for the deflector member 42 relative to the recess 88. In this case for example the deflector member 42 changes its position in a type of circular movement (arrow 103) with respect to the recess 88 in such a way that material 10 is successively changed in a type of kneading effect by a portion of the arc length moving along the peripheral direction. Thus the two sub-layers 83 or 84 are connected via the hollow-profiled transition zone 92, which continuously alters its cross-sectional surface in rotation in accordance with the circling movement of the deflector member 42 with respect to the recess 88.

FIG. 17 shows a further and if necessary independent solution for altering the cross-section in the transition zone 92 inside the guide device 18 for only two deflector members 40 or 41. The arrangement and division of the deflector members 40 to 42 or of the recesses 88 can be effected for example as in FIGS. 9 to 12, a detailed description being omitted here in order to avoid repetition.

It is however also naturally possible to select the three-dimensional shapes of the deflector members 40, 41, 42 and recesses 88 in accordance with the embodiment described in FIGS. 3 to 8. In this Figure, representation of the material 10 flowing through has been omitted for improved clarity.

The guide device 18 again consists of a divided mold, which is formed from the mold lid 28 and the mold base 29 and the mold surfaces 31 or 32 facing one another. Between these mold surfaces 31 or 32 facing one another the flow duct 30 is formed for the material 10. Due to the cross-section selected transverse to the conveyance direction 35, as shown in FIG. 10, the offset arrangement of the deflector members 40 to 42 and the diametrically opposed arrangement on the mold surfaces 31 or 32 can be clearly seen. In this embodiment the displacement of the flow cross-section in the transition zone 92 between the flat sub-layer 83 and the sub-layer 84 offset thereto is shown for only one deflector member 40 in the area of the mold surface 32 and one deflector member 41 in the area of the mold surface 31.

In the entry area 66 to the guide device 18 the two mold surfaces 31 or 32 are spaced apart from one another by the dimension of the thickness 33 of the layer 34. In order now to alter the cross-section 74 between the cover surface 45 of the deflector member 40 and the base surface 94 of the recess 88 in size, this can be done in such a way that the calotte shell-shaped surface 86 selected in this embodiment for the deflector member 40 is located on a cylindrical displacement member 104, whose position relative to the guide device 18 can be changed in a recess 105 in the mold base 29 vertical to the mold surfaces 31 or 32 according to a double arrow 106.

This displacement leads to a reduction or expansion in the cross-section 74 by a displacement path 107, so that the flow cross-section in the cross-section 74 of the delay chamber 75 is likewise reduced. Due to the displacement of the displacement member 104 by the displacement path 107 the flow path length or flow path surface of the flowing material 10 is increased in the area of this displacement member 40 by a dimension which corresponds to twice the displacement path 107. In order nevertheless to obtain a favourable and above all tangential flow approach to the deflector member 40, the displacement member 104 is so designed that the transition from the mold surface 32 to the peripheral surface of the displacement member 104 is rounded. In this way a favourable and laminar flow is achieved for the volume flow of the material 10 flowing through. This elongation of this flow path or of the flow surface has been shown schematically by arrows 108, 109 drawn in dotted lines.

During displacement of the displacement member 104 in the direction of the recess 88 in the opposite mold portion, such for example here as the mold lid 28, it should however be noted that the flow cross-section on the one hand in the transition zone 92 and on the other hand in the delay chamber 75 is not minimised to such an extent that it leads to stoppage of the flowing material 10.

This possible displacement of the flow cross-section is also shown for a deflector member 41 in the area of the mold lid 28, this being effected in a diametrically opposed manner to the previously described embodiment for the deflector member 40. The deflector member 41 is likewise calotte-shell-shaped and located on a further displacement member 110, which is cylindrical, and guided vertically to the mold surfaces 31 or 32 in a recess 111 in the mold lid 28. The displacement member 110 is displaced in the recess 111 according to the double arrow 106 in the direction of the recess 88. In this way again both the flow cross-section in the area of the transition zone 92 and the cross-section 74 in the delay chamber 80 can be changed.

The arrangement of the individual displacement members 104 or 10 can naturally be freely selected, and for example relate to all deflector members 40 to 42. It is naturally also possible to design only individual deflector members 40 to 42, depending on the case of application required, for the guide device 18 with a displacement member 104 or 110 associated therewith.

Displacement of the displacement members 104 or 110 can for example serve only to adjust the homogenising effect of the guide device 18 for any material 10 flowing through, or a plurality of materials can be adjusted to this or to this and their flow properties in themselves. In this way it is possible for example to homogenise various highly viscous materials 10 or also only individual materials in the guide device 18. Independently thereof it could be also envisaged that the individual displacement members 104, 110 are controlled in such a way that their displacement path 107 changes periodically or alternatingly or intermittently, seen in the conveyance direction 35. That is to say that within the guide device 18 the individual displacement members 104 or 110 for each deflector member 40 to 42 adopt a different relative position to the guide device 18, so that for example after the fashion of a wave movement the flow of the volume flow from the material 10 is additionally reinforced. This can lead also to a situation in which the flowing material 10 is transported only by the wave movement or different positions of the individual displacement members 104 or 110 correspondingly within the guide device 18.

Independently thereof, it may also further be envisaged that the displacement members 104 or 110 project with a reducing displacement path 107 into the recess 88, starting from a central area of the guide device 18, seen in the conveyance direction 35, towards the lateral areas of the guide device 18, in order in this way for example to reinforce a distribution of material of the volume flow transversely to the conveyance direction 35 towards the lateral areas of the guide device 18. In this way also a better division of the volume flow is achieved over the entire width 36 of the guide device 18.

Additionally an independently thereof, the individual displacement members 104 or 110, seen both in the conveyance direction and also transversely thereto, i.e. in the direction of the transverse planes 54 to 56, can adopt a different displacement path 107 in the direction of the recess 88 or can change this also in a wave form and/or intermittently and/or in a pulsating manner. These previously described complex displacement procedures can be for example computer-supported, in addition additional detection of position or displacement paths being capable of being undertaken. This will be described in more detail in a subsequent Figure for a simple case of application.

FIG. 18 shows a simplified and if necessary independent solution for the alternating cross-section alteration in the transition zone 92, in order for example to be able to execute the displacement movement described in FIG. 4 of the deflector member 42 with respect to the recess 88 in accordance with the double arrow 101 in the conveyance direction 35.

The guide device 18 with its entry or outlet area 66, 67 is located in this Figure in a side view and in its own securing frame 112, which is in several parts, and is held therein. Thus it is immaterial for the guide device 18 which three-dimensional shapes or spatial arrangements have been selected for the individual deflector members 40 to 42 and the recesses 88 associated therewith.

In this embodiment the mold lid 28 of the guide device is stationary in the securing frame 112 and is held therein. The mold base 29 on the other hand is supported on a positioning plate 113 of a thickness adjusting device 114 parallel to the mold surfaces 31 or 32 on the positioning plate 113. This positioning plate 113 can be adjusted for height by means of the thickness adjusting device 114, as realised here for example by hydraulic cylinders, vertical to the mold surfaces 31 or 32.

Naturally, other possible forms of thickness adjustment may be imagined. This may be produced by any means known from prior art, and can be formed for example by spindle drives, eccentric drives, screw spindles, travelling nut arrangements, etc. In the area of the surface of the positioning plate 113 facing the guide device 18 there is located a guide 115 for the mold base 29, which can for example be formed as a longitudinal web, dovetail guide, T guide, etc. co-operating with a recess diametrically opposite thereto in the mold base 29, and guiding the latter in the direction of the conveyance direction 35.

In order to alter the flow cross-section in the transition zone 92 according to FIG. 14, it is necessary to connect the mold base 29 with a position altering device 116 or to couple it therewith, in order to produce the relative movement of the mold base 29 relative to the mold lid 28, as indicated by the double arrow 101. In the present embodiment the position altering device 116 is formed for example by a motor with an eccentric disc, which is kinetically connected by means of a coupling member 117 to the mold base 29. Upon rotation of the motor and of the eccentric mounting of the coupling member 117 on the eccentric disc and co-operation with the guide 115 there is a continuous or intermittent alteration in the flow cross-section in the transition zone 92 between the deflector member 42 and the recess 88. The eccentricity must be so selected that it leads to no mechanical damage between the mold lid 28 and the mold base 29 with the deflector members 40 to 42 projecting into one another and the recesses 88.

The position altering device 116 can however naturally also be based on any other known type according to prior art and for example be based on a magnetic, electric, hydraulic, pneumatic or mechanical method. In order to be able to vary the thickness 33 of the layer 34 inside the guide device 18, the thickness adjusting device 114 and the positioning plate 113 connected therewith are provided. Thus for example the thickness 33 can be adjusted depending on the material or fluid or materials used or to be homogenised, and fixed in this position. Independently thereof however, a pulsating and/or alternating or intermittent adjustment of the thickness 33 are possible vertical to the mold surfaces 31 or 32 by the thickness adjusting device 114, in order also in this area to achieve an additional kneading effect for the material to be homogenised, as is for example possible by means of a vibratory drive with the most varied frequencies. It is however also possible for the two mold surfaces 31, 32 facing one another to be set in a vibratory movement aligned parallel to the mold surfaces 31, 32 by a vibratory drive.

FIG. 19 shows a schematically simplified control device 118 with a connected input unit 119 for the various detection or control and/or regulation of variable operational magnitudes for the guide device 18. In the embodiment shown here of the guide device 18, the regulating devices, measurement value detections, cooling and or heating devices, position detecting devices and distance measuring devices shown and described here can if necessary represent in themselves independent embodiments and solutions according to the invention. Furthermore, the view selected here is only schematically shown for individual areas, and it is naturally possible to combine the various embodiments optionally with one another or to arrange them at will only in areas and/or in all the deflector members 40 to 42.

In the entry area 66 of the guide device 18 the previously described embodiment is shown for the deflector member 40 with the displacement member 104 combined therewith. The displacement member 104 is in the form of a double-acting cylinder, which is in a flow connection with a supply unit 121 via a switch-over unit 120 via connecting lines. The switch-over unit 120 is in the form for example as a 3/2 two way valve, which serves as an adjusting member and is connected via lines to outputs 122 of the control device 118. Furthermore the supply unit 121 for example has a pump 123, which is likewise connected via lines to the outputs 122 of the control device 118. the displacement member 104 is further fitted with a position detecting device 124, one output of this position detecting device being connected to one input 125 of the control device 118. The position detecting device 124 now permits the position of the displacement member 104 relative to the mold base 29 of the guide device 18 to be detected, and thus the position of the deflector member 40 within the recess to be determined. Due to this determined measurement value of the position detecting device 124, the control device 118 can correspondingly control via the output 112 the pump 123 and/or the switch-over unit 120, and thus produce a displacement of the displacement member 104 by a corresponding displacement path 107.

There is further located in the entry area 66 to the guide device 18, in the area of the flow duct 30, a respective sensor 126 or 127, the sensor 126 for example detecting the pressure exerted on the material 10, and the sensor 127 the flow speed of the material, each of these communicating via lines with the inputs 125 of the control device 118 and transmitting the measurement values to these. A further sensor 128 is located in the area of the delay chamber 125 and serves for example to detect the temperature, the sensor 128 likewise connecting via a line with the control device 118 and its inputs 125.

Furthermore, there is shown schematically in the outlet area 16 in the mold lid 28 a further displacement member 110 with the deflector member 41 located thereon. There may be associated with this displacement member 110 its own deflector member 41, its own supply unit 121 with a pump 123 and its own position detecting device 124. Likewise, there are located in the outlet area 67 in the flow duct 30 their own sensors 129 to 131, the sensor 129 for example detecting the pressure of the material 10 in the outlet area 67, the sensor 131 flow speed of the material 10 and the sensor 131 the temperature of the same and the individual sensors communicating via lines with the inputs 125 of the control device 118, and transmitting the measurement values thereto.

Due to this determination of a measurement value, based on the determination of an actual value, it is now possible to determine the measured actual values of pressure and/or speed and/or temperature both in the entry area 66 and in the outlet area 67 of the guide device 18, and to pass them on to the control device 118. In the control device 118 the determined actual values are compared with the predetermined desired values, the control device 118 sending corresponding control signals, e.g. to the switch-over unit 120 or to the supply unit 121, in order to be able to carry out the necessary adjustment of the displacement member 104. It is further also possible, as is shown schematically, if fluctuations occur between the temperature originating from the desired value in the entry area 66 to the desired value in the outlet area 67, to carry out heat adjustment of the material 10 flowing through to the corresponding desired value by means of heating members 132 or cooling devices 133.

In this respect the heating elements 132 are for example in the form of electrical heating elements, and a coolant medium for example flows through the cooling device 133. A detailed illustration of feed or return pipes as well as for the supply device for the feed or return of coolant has been omitted for reasons of clarity, and in this case any arrangements or devices known from prior art can be used. It would also be possible, instead of the electrical heating elements 132, for example to use elements through which a heat-treated medium such for example as oil is passed, or to locate the flow openings in the mold lid 28 and/or mold base 29. This also applies to the cooling devices 133 selected. These may naturally be combined together at will.

In order to obtain a thermal separation of the mold lid 28 and/or the mold base 29 over their longitudinal extension, i.e. seen in the conveyance direction 35, these can be separated by an insulating layer 134 schematically located transversely to the conveyance direction 35. Purely in order to retain the flow duct 30 unaltered or to achieve an flat and even passage, only in the area of the flow duct 30 is a minimum mold web provided between the two halves of the mold lid 28 and/or the mold base 29.

In order to be able to co-ordinate the course of homogenization and/or mixing within the guide device even better to the materials to be mixed and/or homogenised or to the individual material 10 or fluid, a corresponding alteration of the program execution within the control device 118 can be effected via the input unit 119. The control device 118, in conjunction with the input unit 119, which can likewise be a computer, can be connected by line e.g. to the systems 1 or 21 shown in FIGS. 1 and/or 2, and control the operation of the plasticising unit 8 or 23 taking place at that point.

Naturally however it is also possible to interchange the heating elements 132 or the cooling device 133 for one another at will, or to combine them, in order to obtain the most favourable process execution for the material 10 or the materials.

In FIG. 20 the guide device 18 is shown inside the securing frame 112 and consists of the mold lid 28 and the mold base 29. The arrangement of the deflector members 40 to 42 or of the recesses 88 can be selected in accordance with the embodiments previously described. In the embodiment shown here the securing frame 112 shown here is likewise at least two-part in form and encloses with its receiving space 135 both the mold lid 28 and the mold base 29. Between the two mold halves, i.e. the mold lid 28 and the mold base 29, the flow duct 30 is located, through which the material 10 is passed through the guide device 18. Connecting with surfaces 136 or 137 of the mold lid 28 or the mold base 29 facing away from mold surfaces 31 or 32 facing one another of the guide device 18, are intermediate members 138 or 139, which can be in the form of spacer and/or heating and/or cooling elements. With a given overall height 140 of the receiving space 135 in a vertical direction to the mold surfaces 31 or 32, and minus thicknesses 141 or 142 of the guide device 18 and the thickness 33 of the layer 34, there result heights 143 or 144 for the intermediate members 138 or 139. Upon an alteration of the heights 143 or 144 symmetrically to the thickness 33 of the layer 34, the thickness 33 for the layer 34 can be simply varied.

For corresponding heat control of the guide device 18, in these embodiments the two halves of the securing frame 112 are provided both with heating elements 132 and/or cooling devices 133, so that heat can be supplied to and/or removed from the mold halves, i.e. the mold lid 28 or the mold base 29 of the guide device 18. By means of the relative surface enlargement within the guide device 18 for the flow duct 30 due to the arrangement of the deflector members 40 to 42 or the recesses 18 it is possible in a simple way to heat-treat the volume flow of the material 10 flowing through in a corresponding manner, i.e. to cool it and/or heat it. In this way also a rapid feed or return of heat is provided.

Electrical heating elements and/or elements through which a medium flows may for example be used as a heating element 1342. Likewise for example, ducts through which the medium flows can be used for the cooling device 133, through which a corresponding medium flows which has a high heat-absorbent capacity. A thermal separation seen in the conveyance direction of the guide device 18 is naturally in this embodiment possible both for the retaining frame 112 and/or for the mold lid 28 or mold base 29.

FIG. 21 shows a further possible arrangement of the deflector members 40 to 42 or the recesses 88 associated therewith, an opposed arrow-shaped arrangement in grouped rows 145 to 150, seen in the conveyance direction 35, being schematically indicated.

The arrangement of the deflector members 40 to 42 or of the recesses 88 in the individual rows 37 to 39 transversely to the conveyance direction 35 are also in the conveyance direction 35 can correspond in its dimensions or spacings to those described in the embodiments in FIGS. 3 to 12. The arrangement of the individual grouped rows 145, 147, 149 or 146, 148, 150 originates from a medial longitudinal axis 151, which is aligned in the conveyance direction 35 and parallel to the mold surfaces 31 or 32, and diverges in an arrow-shape in the direction of lateral areas 152 or 153 of the guide device 18. Thus there is formed between the grouped rows 145 and 147 a cross-flow duct 154, and between the grouped rows 147 and 149 a cross-flow duct 155 originating from the medial longitudinal axis 151 in the direction of the lateral area 152. In the direction of the lateral area 153, originating from the medial longitudinal axis 151, there is formed between the grouped row 148 a cross flow channel 156, and between the grouped row 146 and 148 and 150 a cross-flow duct 157. By means of this arrow-shaped design of the individual cross-flow ducts 154 to 157 between the individual grouped rows 145 to 150, a better distribution over the entire width 36 of the guide device 18 is achieved. This is further reinforced by the arrangement in succession of the recesses 88 in the grouped rows 145 or 146 or the deflector members 41 or 42 in the grouped rows 147, 148 and the recesses 88 in the grouped rows 149 or 150.

Another possible and if necessary independent embodiment of the distribution of the volume flow over the width 36 of the guide device 18 can also be carried out, as shown schematically with reference to a deflector member 40 in the row 37 by an ellipsoid base form 158. The diametrically opposed base form for the recess 88 is likewise indicated in dotted lines at a recess 88 in row 37. Thus the shorter semi-axis is aligned transversely to the conveyance direction 35, and the longer semi-axis in the direction of the conveyance direction 35 and parallel to the mold surface 32. With a correspondingly diametrically opposed and offset arrangement of the recess 88, upon rotation both of the deflector member 40 and also of the recess 88 associated therewith until there is a possible transverse positioning of the longer semi-axis transversely to the conveyance direction 35, the increase in flow resistance can be further added to. In accordance with a double arrow 159 drawn in, an additional transverse movement of the volume flow depending on the angle of rotation and the direction of rotation of the deflector member 40 with its associated recess 88 can be achieved. This can be used for a controlled transverse movement and distribution of the mass flow over larger widths 36, and thus for example in the area of wide slot nozzles can be used for the extrusion of wide and thin profiles or panels. Thus on the one hand there is a favourable distribution of the volume flow, seen over the width 36 of the guide device 18, and simultaneously, during passage through the individual delay chambers or also cross-flow ducts 154 to 157, a good homogenization and/or mixing of the material 10.

It should be noted for all variant embodiments previously described of the process treatment of the layer 34 and for the devices designed for this purpose, that the transitions between the individual surfaces, e.g. the mold surfaces 31, 32 or the recesses 88 of the deflector members 40 to 42 are so selected that the duration time of the fluid or material 10 remains approximately the same over the entire treatment duration of the layer 34 or of its passage through the device. This is intended above all to avoid a situation in which portions of material of the layer 34 remain for a long time in build-up zones, and are exposed to the influences of the heat-control means, or where portions of the material remain stationary for a long period in the treatment area or in the device. In this way overheating and destruction of the fluid or material 10 is reliably avoided.

In order to provide improved mixing of fluids or materials 10 it can also prove advantageous if the spacings 57, 58 between the transverse planes 54 and 56 arranged in succession in the flow or conveyance direction 35, and distances 51 to 53 between longitudinal planes 47 to 50 between the individual deflector members 41, 42 or recesses 88, seen over the treatment area or the mold surface 31, 32 are variously established or are pre-settable or adjustable to various values. Similarly, the depth 91 or the dimension 93 in the area of the various sub-layers or of the various deflector members 41, 42 and recesses 88 can be of different sizes, in order to achieve improved mixing or homogenization.

FIGS. 22 to 26 show a further possible and if necessary independent design of the guide device 18, the same reference numbers being used for identical parts as in the previous FIGS. 1 to 21. In order to avoid unnecessary repetition additional reference is made to the description relating to the preceding Figures. Naturally it is however also possible to use or utilise in particular the embodiment described with respect to FIGS. 13 to 20 also in the guide device 18 described here, in order to achieve an additional improvement in mixing and/or heat-treatment and/or homogenization for the layer 34 of the material 10 passed through the guide device 18.

As is now best seen from FIG. 22, the guide device 18 consists of the mold lid 28 (not shown here), the mold base 29 and an additional intermediate plate 160 located between these. It is further schematically indicated that the guide device 18 is defined on both sides, seen in the conveyance direction 35, by its own lateral portions 161, 162, of which only one lateral portion 161 is visible here. The illustration of further feed and return devices to the guide device 18 has been omitted here for reasons of clarity. It is however also possible, as another possible design for the intermediate plate 160, to form the side facing the mold lid 28 as a mold base 29, and the side facing the mold base 29 as a mold lid 28 and for example to connect them together. Thus now for example a portion of the intermediate plate 160 faces the mold lid 28 as a mold base 29, and a further portion of the intermediate plate 160 faces the mold base 29 as a mold lid 28.

As is to be seen from consideration of FIGS. 23 to 25 together, in this embodiment the mold lid 28 and the mold base 29 are similar in design, in the successive rows 37 to 39 located behind one another in the conveyance direction 35, the individual deflector members 40 to 42 being located thereon and aligned respectively centrally to one another. Thus the individual deflector members 40 to 42 in this embodiment have a portion of a spherical surface 86, although it is naturally also possible to use any other three-dimensional shape already described in detail.

The individual rows 37 to 39 are located in the transverse planes 54 to 56 located in the conveyance direction 35 one behind the other, which are spaced apart from one another respectively by a distance 57, 58. In this embodiment also the deflector members 44 are offset transversely, seen in the conveyance direction 35, relative to the deflector members 40, 42. Thus the two deflector members 40, 42, located roughly flush one behind the other, are located on the longitudinal planes 47, 48 aligned parallel to the conveyance direction 35 and has a normal to the mold surfaces 31, 32, the two longitudinal planes 47, 48, seen transversely to the conveyance direction 35, again being spaced apart by the distance 51. The deflector members 41 of row 38 are located in their own longitudinal planes 59 to 61 extending parallel to the longitudinal planes 47, 48, the degree of offsetting 62 between the longitudinal planes 47, 48 and the longitudinal planes 59 to 61 corresponding preferably to half the distance 51 between the longitudinal planes 47 and 48. The longitudinal planes 59 to 61 are located transversely to the conveyance direction 35 and spaced apart by the distances 63, 64.

It is essential in selection of the distances 51 or 63 and 64 and of the spacings 57, 58 between the longitudinal planes or rows, that there is formed between the rows, located one behind the other and offset to one another, of the individual deflector members 40 to 42, a rectilinear continuous duct, originating from the inlet area 66 towards the outlet area 67 of the guide device 18.

FIGS. 23 and 24 of this embodiment show that the two mold surfaces 31, 32 are spaced apart by a distance 163, said distance 163 having a substantially larger dimension than the previously described thickness 33 of the layer 34. In order now to obtain also in the embodiment shown here of the guide device 18, an optimum treatment of the material 10 or of the free-flowing fluid passing through, their own intermediate plate 160 is located between the two mold surfaces 31, 32 in order to reduce the width 163. This intermediate plate 160, seen in the direction of the width 163, has a thickness 164 which is so selected that the thicknesses 33 for forming the flow ducts 30 or the inlet ducts 85 for the layer 34 are formed between mold surfaces 165, 166 facing away from one another, or outer surfaces of the intermediate plate 160 and its associated mold surfaces 31, 32 of the mold lid 28 or mold base 29.

Formation of the two preferably parallel flow ducts 30 originating from the inlet area 66 toward the outlet area 67 is now effected on the one hand between the mold surface 31 of the mold lid 28 and the mold surface 165 or outer surface of the intermediate plate 160, and between the mold surface 38 of the mold base 29 and the mold surface 166 facing it, or the outer surface of the intermediate plate 160. Due to the design aligned respectively towards one another, or the raised design of the individual deflector members 40 to 42 on the mold surfaces 31, 32, in this embodiment the recesses 88 associated therewith are respectively formed centrally to the individual deflector members 40 to 42 in the intermediate plate 160. In this way the transition zones 92 are formed between the deflector members 40 to 42 and the recesses 88.

As is now best seen from FIGS. 23 and 24, the respective deflector members 40 to 42, originating from the mold surfaces 31 or 32 in a normal direction thereto, have the heights 46. Further, the sum of the heights 46 of two deflector members 40 to 42, directly facing one another, of the mold lid or mold base 29 is less than the width 163 between the two mold surfaces 31, 32. Thus the height 46 of the individual deflector members 40 to 42 corresponds at least to the thickness 33 of the layer 34 in the flow duct 30. As is now shown with respect to the two deflector members 40 of row 37 in FIG. 23, the delay chambers 75 are again formed between the surfaces 86 of the deflector members 40 to 42 and the inner surfaces 89 of the recesses 88, the cross-sections 74 of the delay chambers 75 being so selected, that respectively the sum of heights 46 or cross-sections 74 of respectively associated deflector members 40 to 42 and their directly associated recesses 88 is greater than the width 163 between the two mold surfaces 31 and 32, so that the two recesses 88 associated with one another overlap. Thus an overlap area 168 is formed between the recess 88 respectively associated with one another, which extend, originating from the mold surfaces 165, 166 to a plane 167 between these and preferably aligned parallel and centrally, into the intermediate plate 160. This overlap area 168 is also a measure for the intersection or overlap of the recesses 88 respectively associated with one another, so that the design of the base surface 94 previously described is not possible. Instead of this there is formed in the area of the plane 167 between the recesses 88 respectively associated with one another an aperture 169, so that likewise an additional mixing or flow movement between the material of the layers 34 passing through the guide device 18 is possible also in the area of the plane 167 or of the apertures 169. Independently thereof, it is however also possible for the two recesses 88 associated with one another only to be tangential to one another or to be spaced apart from one another in the area of the planes 167, and therefore, in order to establish a connection between the individual recesses 88, the aperture 169 is provided. Thus again a connection and a thus connected mixing between the material 10 of the two flow ducts 30 extending parallel to one another is possible. However, a parallel arrangement alone of a plurality of flow ducts 30 without interconnection is also possible inside the guide device 18.

The displacement and the mixing and/or homogenization and/or heat treatment entailed therewith can be effected in accordance with the embodiments previously described. The same also applies to the various possible designs relating to the three-dimensional shapes for the deflector members 40 to 42 and the recesses 88 associated therewith.

It is also indicated additionally in FIG. 23, that both in the entry and/or outlet area 66, 67 at the intermediate plate 160, their own distributing means 170 can be located for better guidance and leading, both into the guide device 18 and out of it. These distributor means 170 can again have the most varied three-dimensional shapes, conical or pyramidal three-dimensional shapes having proved favourable in practice. Furthermore, an additional connection nozzle 171 is shown in dotted lines in the entry area 66, through which for example the material passing through the guide device 18 is brought or conveyed from a system 1, 20 described in FIGS. 1 and 2. As is further to be seen from this drawing, the plane 167 is located centrally and parallel to the two mold surfaces 165, 166, this plane 167 representing a plane of symmetry with respect to the recesses 88 located in the area of the mold surfaces 165, 166.

FIG. 26 shows the intermediate plate 160 for the guide device 18, from which also the mutually-offset arrangement and the individual recesses 88 and the association with the deflector members 40 to 42 can be seen. The individual recesses 88 are located centrally to the deflector members 40 to 42 associated therewith, and extend, starting from the mold surface 165 or 166 shown here in the direction of the plane 167 shown in FIGS. 23 or 24, in which in this embodiment there is formed between the recesses 88 associated with one another, the aperture 169. The cross-section of the aperture 169 is on the one hand dependent on the selected three-dimensional shape of the recesses 88 and on the selection of the size of the overlap area 168.

It can further be seen from the illustration in FIG. 26 that the distributor means 170 are located on end faces of the intermediate plate 160, which face the entry or outlet area 66, 67. In this embodiment both the mold lid 28, the mold base 29 and the intermediate plate 160, seen transversely to the conveyance direction, have the same width 36, so that the width of the layer 34 passing through the guide device 18 is also fixed. This width 36 again is a multiple of the thickness 33 of the layer 34, which is passed, starting from the inlet area 66, to the outlet area 67 through the guide device 18.

FIGS. 27 to 29 show a further possible and if necessary independent embodiment of the guide device 18, the same reference numbers being used for identical parts as in the preceding FIGS. 1 to 26. In order likewise to avoid unnecessary repetitions, additional reference is made to the description in the preceding Figures. Naturally it is however possible, in particular to utilise or use the embodiments described in FIGS. 13 to 20 in this guide device also described here, in order to obtain an additional improvement and/or heat-treatment and/or homogenization of the layer 34 of the material 10 passed through the guide device 18.

The embodiment described here is similar to the embodiment as described in FIGS. 22 to 26, in which the intermediate plate 160 is located between the mold lid 28 and the mold base 29, and in which the mold surfaces 165, 166 facing away from one another, face the mold surfaces 31, 32 of the mold lid 28 or mold base 29. Furthermore, the mold lid 28 and the mold base 29 are similar in design, whereby, at the mold surfaces 31, 32 facing one another again in the rows 37 to 39 located one behind the other in the conveyance direction 35, the individual deflector members 40 to 42 are located thereon and are aligned centrally to one another and towards one another. In this embodiment, the individual deflector members 40 to 42 have a partial area of a spherical surface 86, although it is naturally also possible to use at will any other three-dimensional shape already described in detail. It is however also possible to design the intermediate plate 160 as a mold lid 28 or mold base 29, and preferably to connect them together.

The individual rows 37 to 39 are located in the transverse planes 54 to 56 located one behind the other in the conveyance direction 35, which are spaced towards one another respectively at a spacing 57, 58 from one another, in which both the individual deflector members 40 to 42 and the recesses 88 associated therewith are located. The degree of offsetting of the deflector members 41, seen transversely to the conveyance direction 35, is effected relative to the deflector members 40, 42 by the degree of offsetting 62. The deflector members 40, 42 and the recesses 88 associated therewith are located in the longitudinal planes 47, 48 aligned parallel to the conveyance direction 35 and normal to the mold surfaces 31, 32, 165, 166, again the two longitudinal planes 47, 48, seen transversely to the conveyance direction, are spaced apart by the distance 51. The deflector members 41 offset to the deflector members 40, 42, and the recesses 88 associated therewith of row 38, are located in their own longitudinal planes 59 to 61 extending parallel to the longitudinal planes 47, 48. The degree of offsetting 62 between the longitudinal planes 47, 48 and the longitudinal planes 59 to 61 is preferably half the distance 51 between the longitudinal planes 47 and 48. The longitudinal planes 59 to 61 are located transversely to the conveyance direction 35 and spaced apart by the distances 63, 64.

The two mold surfaces 31, 32, upon which the deflector members 40 to 42 are located, are spaced apart from one another by the width 163. The intermediate plate 160 has the thickness 164, which is so selected that the respective thicknesses 33 are formed in order to form the flow ducts 30 or the inlet ducts 85 for the layer 34 between the mold surfaces 165, 166 facing away from one another or the outer surfaces of the intermediate plate 160 and the mold surfaces 31, 32 facing these. The flow ducts 30 are now on the one hand located between the mold surface 31 of the mold lid 28 and the mold surface 165 of the intermediate plate 160 and of the mold surface 32 of the mold base 29 and the mold surface 166 facing it, of the intermediate plate 160.

The design of the deflector members 40 to 42 with their heights 46 and the selection of the cross-section 74 of the delay chambers 75 and the design entailed therewith of the individual apertures 169 in the area of the recesses 88 is as accords with the description of FIGS. 22 to 26, so that, in order to avoid unnecessary repetitions, reference is made to the detailed description in these Figures.

In addition, there are located within the intermediate plate 160 between the recesses 88 respectively offset to one another of rows 37 to 39, its own connecting ducts 172, which, in an arrangement differing from one another, respectively connect the recesses 88 located in the area of the mold surface 165, 166 with those recesses 88 which are located in the area of the mold surface 166, 165 of the intermediate plate 160. Thus the connection of the flow ducts 30 can be established to one another in an identical and/or non-identical direction.

This arrangement of the connecting ducts 172 can be effected in the most varied ways, and in this embodiment the connecting ducts 172 are located as a mirror image with respect to the longitudinal plane 60. Furthermore, the arrangement of the connecting ducts 172 is not parallel to the conveyance direction 35, but inclined spatially thereto, and depends on the selected size of the recess 88, of the selected spacing 57, 58 between rows 37 to 39 and of the distances 51, 63 and 64 between the longitudinal planes 47, 48 and 59 to 61. In alignment of the connecting ducts 172 care should be taken however that that branched-off partial area or partial flow of the layer 34, which is passed through the connecting ducts 172, encloses with a layer an angle which is preferably less than 90°.

If one now considers the arrangement and alignment of the individual connecting ducts 172 respectively between the individual longitudinal planes 59 and 47, 47 and 60, 60 and 48 and 48 and 61, there are formed between these, seen in the conveyance direction, longitudinal sections 173 to 176. The individual connecting ducts 172, seen in the conveyance direction 35, each have their own inlet openings 177 and the outlet opening 178 subsequent thereto. In this embodiment in the longitudinal section 173 the inlet openings 177 are respectively located in the area of the mold surface 165 facing the mold surface 31 in the region of the recesses 88, and the outlet openings 178 are located on the mold surface 166 facing the mold surface 32 in the region of the further recesses 88. In contrast, in the longitudinal section 174 the inlet openings 177 are located in the area of the recesses 88 associated with the mold surface 166, and the outlet openings 178 are located in the area of the recesses 88 associated with the mold surface 165.

Thus, seen in the conveyance direction 35, the material is passed in addition in a diametrically opposed manner between the individual longitudinal sections 173, 174 through the intermediate plate 160. Due to the mirror-image design or arrangement previously described of the connecting ducts 172 with respect to the longitudinal plane 60, the connecting ducts 172 in longitudinal section 175 are identically disposed to the connecting ducts 172 in the longitudinal section 174, and the connecting ducts 172 in longitudinal section 176 are disposed identically to the connecting ducts 172 in longitudinal section 173. Due to this arrangement, the inlet openings 177 and the outlet openings 178 of a connecting ducts 172 are offset to one another in the conveyance direction 35 and/or transversely thereto, the inlet openings 177 of a connecting ducts 172 being in a flow duct 30 and the associated outlet opening 178 in the other flow duct 30. Preferably however the inlet openings 177 of the connecting ducts 172 are located in the area of a narrowing cross-sectional surface of the transition zone 92 of one flow duct 30, and the outlet openings 172 associated therewith of the connecting ducts 172 in a further transitional area of the transition zone 92 of the other flow duct 30, in which the cross-sectional areas enlarge in the conveyance direction 35. It is further of advantage if a cross-sectional area in a cross-sectional plane in the area of the deflector members 40 to 42 aligned to the conveyance direction 35 of the material 10 or fluid is greater than the rectilinear configuration of a flow duct 30 in the conveyance direction 35. Thus, seen in the conveyance direction 35, the inlet opening 177 associated with the respective connecting duct 172 is located in front of the outlet opening 172, so that an angular alignment of this partial flow or partial area with respect to the layers 34 is effected.

This previously described alternating and mirror-imaged passage of the material 10 through the guide device 18 is only one of many possibilities for the additional connection of the respective recesses 88 located in the area of the mold surfaces 165, 166. In this way an even better preparation, homogenization, heat-treatment and if necessary mixing of the material 10 passed through the guide device 18 is achieved. In this embodiment, the connecting ducts 172 have a roughly circular cross-section, although it is naturally also possible to use any other cross-sectional shape at will, such for example as slots, etc., or to construct them differently from one another. Preferably, identical cross-sectional dimensions are selected for the individual connecting ducts, although naturally cross-sectional dimensions are possible which are different from one another, so that a controlled flow movement or guidance of the material or fluid is achieved.

It is essential in all guide devices 18 described here, that when the material passes through these, even if a plurality of layers are disposed parallel to one another inside the guide device 18, individual layers are spatially deformed in different ways in the form of a cohesive layer, without being separated from one another. This treatment procedure of the material or free-flow fluids is possible in that, between a plurality of successive cross-sectional planes, longitudinal sections with a larger cross-section and longitudinal sections with a smaller cross-section continuously alternate, although a volume flow of the material or fluid per-unit of time is of identical magnitude in a plurality of partial areas adjacent to one another. This treatment is additionally reinforced in that the material or fluid is moved forward in the partial areas immediately adjacent to one another at least in some longitudinal sections with different flow speeds, at least in the flow direction, at least the flow speeds of the material or fluid different in the individual longitudinal sections being established in each partial area by different cross-sectional surfaces of the partial area succeeding one another in the flow direction.

It is also however possible for the material or fluid to be divided into a plurality of layers extending parallel and cohesive in the conveyance direction, and for each of these layers to be differently spatially deformed in partial areas immediately adjacent to one another and extending parallel in the conveyance direction. This deformation in the individual partial areas extending parallel to one another is effected in the individual partial areas, seen in the conveyance direction, in succession on different cross-sectional surfaces. An additional treatment of both layers in the successive longitudinal sections of the partial areas is effected in a direction extending parallel to the thickness in a cross-sectional plane by an amount which represents at least the largest part of the dimension of the thickness of the layer, and is effected in a direction respectively facing the opposite layer and the deformation is effected in the direction thereof. By means of this offsetting, mixing of the layers in the area of their sub-layers offset to one another with one another and among one another is effected.

It is however also possible, in transitional areas of a layer between the sub-layers respectively offset to one another, for a partial area of partial flow of this layer to be separated and passed to a transitional area between the sub-layers offset to one another of the further layer. This partial flow or partial area of the layer is passed between the transitional areas in a direction particularly also in a plurality of three-dimensional areas, extending obliquely to the layer, from one layer to the other. Thus the branched-off partial area or partial flow encloses between the transitional areas and the layer an angle which is preferably less than 90°. It is however also possible for the partial area or partial flow to be removed between the transitional areas of both layers in a transitional area of a layer in which the cross-sectional surface tapers in the conveyance direction of the material or fluid, and is passed to a transitional area of the other layer in which the cross-sectional area of this layer enlarges in the conveyance direction of the fluid. In order to achieve uniform and directed flow or flow movement of the fluid through the guide device, it is advantageous if a number of partial flows which are passed from one layer to the further layer, correspond to the partial areas or partial flows or their volume flow which are returned from the further layer to the first layer.

Furthermore, the layer can be deformed in successive longitudinal sections of the partial areas in a direction extending parallel to the thickness into at least sub-layers offset relative to one another by the larger part of the dimension of the thickness, and it is in addition also possible to alter the length of the flow paths between cross-sectional planes succeeding one another directly in the flow direction. It is however also advantageous if the layer is passed in successive longitudinal sections of the partial areas respectively alternatingly in the direction of one of the opposite surfaces of the layer, offset at least by the dimension of the thickness of the layer, a flow path surface travelled by the fluid between the beginning and the end of the spatial deformation however being of identical size in the partial areas adjacent to one another.

A favourable treatment of the material or fluid is achieved if the flow speed of the material or fluid in the partial areas adjacent to one another of the layer is of identical magnitude in the cross-sectional plane immediately following the spatial deformation in the conveyance direction, and the layer in a cross-sectional plane in the partial areas adjacent to one another in a direction extending parallel to the thickness, is offset to one another at least by the thickness, and has a different thickness. Furthermore, the thickness of the layer with an increasing spacing from a flow plane connecting the area in front of the spatial deformation with the area directly after the spatial deformation of the layer directly in the flow plane can be greater than in the area before the spatial deformation, and in addition the pressure in the material or fluid in front of the spatial deformation can be higher than in the area after the spatial deformation. Furthermore, the pressure drop between the area in front of the spatial deformation and the area after the spatial deformation can be adjustable, this adjustment of the pressure drop being achievable by an alteration in the cross-sectional volume in the layer, and this pressure drop being of identical magnitude in addition in partial areas adjacent to one another, and further the pressure of the material or fluid, at least in the area in front of the spatial deformation and in the area immediately after the spatial deformation is detected and held to a predeterminable or predetermined value by alteration of the volume of the layer and/or of a partial area of the layer. It is however also possible to alter the pressure drop between the area in front of and the area immediately after the spatial deformation by altering the temperature of the material or fluid or keeping it to a predeterminable value. However, the temperature of the material or fluid between the area in front of the spatial deformation and the area after the spatial deformation can be monitored or detected at least at one point, and in addition the deviation of a temperature of the material or fluid in the layer from a required temperature is preferably simultaneously determined and if necessary monitored at a plurality of points distributed over the surface, and a deviation so detected of the layer or of a partial area of the layer from the required temperature is compensated for by the addition of or removal of energy.

The treatment result of the layer or of the material can be further improved if a cross-sectional surface of the transition zone between two sub-layers of the layer offset to one another in the direction of the thickness are periodically, particularly intermittently altered, this alteration of the thickness of the cross-sectional surface of the transition zone being effected in opposite directions in a plane vertical to the flow direction, and it is also possible to execute the alteration of the cross-sectional surface of the transitional zone alternatingly in a direction extending in the flow direction. This alteration of the cross-sectional surface can however also be effected in the vertical plane parallel to the sub-layers of the layer offset to one another, these sub-layers offset to one another being connected by a hollow profile-shaped transition zone and the cross-sectional surface of this transition zone can be successively altered over a pre-adjustable portion of the arc length moved along in the circumferential direction. This linear and/or three-dimensional thickness of the layer can be spatially altered with a pre-defined vibration, which preferably has a frequency of less than 30 Hz. A frequency of greater than 1 Hz is however also possible for the spatial and/or linear alteration of the thickness of the layer.

Furthermore, deformation of the thickness of the layer can be effected in an alternating manner in the flow direction, and in addition the alteration of the thickness of the layer in the partial areas located in the central area of the layer is greater than in the lateral areas and preferably, starting from the central area, reduces uniformly in the direction of the lateral areas.

It is however also naturally possible to design the flow duct 30 seen in the conveyance direction 35 not as flat or straight, but to give this any possible curved three-dimensional shape as far as an enclosed profile cross-section.

As a matter of order it is pointed out that for better understanding of the function of the guide device 18 according to the invention, many parts thereof have been shown schematically and out of proportion. Furthermore, individual designs of the embodiments, or the embodiments themselves, can form independent solutions in themselves. It is naturally possible within the framework of the invention, going beyond the embodiment shown, for the arrangement of the deflector members, the recesses, the displacement members, the position detecting device, the sensors, the heating elements and the cooling devices to be variously combined with one another, or for them also to represent independent inventive solutions.

Above all, the individual constructions shown in FIGS. 1;2;3 to 8;9 to 13;14;15;16;17; 18;19;20;21;22 to 26 and 27 to 29 can form the subject matter of independent inventive solutions. The objects and solutions relative thereto are to be seen in the detailed descriptions of these Figures.

List of reference numbers 1. system
2. molded part
3. injection molding machine
4. machine bed
5. support surface
6. injector unit
7. closer unit
8. plasticising unit
9. receiving container
10. material
11. heating element
12. injection molding tool
13. mold cavity
14. drive device
15. control device
16. switchgear cabinet
17. connecting line
18. guide device
19. worm
20. system
21. article
22. extruder
23. plasticising unit
24. extrusion tool
25. machine bed
26. conveyor worm
27. nozzle lip
28. mold lid
29. mold base 30. flow duct
31. mold surface
32. mold surface
33. thickness
34. layer
35. conveyance direction
36. width
37. row
38. row
39. row
40. deflector member
41. deflector member
42. deflector member
43. base length
44. base length
45. cover surface
46. height
47. longitudinal plane
48. longitudinal plane
49. longitudinal plane
50. longitudinal plane
51. distance
52. distance
53. distance
54. transverse plane
55. transverse plane
56. transverse plane
57. spacing
58. spacing
59. longitudinal plane
60. longitudinal plane
61. longitudinal plane
62. offsetting
63. distance
64. distance
65. overlap
66. inlet area
67. outlet area
68. partial area
69. partial area
70. partial area
71. partial area
72. partial area
73. partial area
73'. partial area
74. cross-section
75. delay chamber
76. acceleration duct
77. delay chamber
78. height
79. acceleration duct
80. delay chamber
81. longitudinal section
82. longitudinal section
83. sub-layer
84. sub-layer
85. inlet duct
86. surface
87. angle
88. recess
89. inner surface
90. angle
91. depth
92. transition zone
93. dimension
94. base surface
95. plane
96. plane
97. plane
98. plane
99. outer diameter
100. inner diameter
101. double arrow
102. double arrow
103. arrow
104. displacement element
105. recess
106. double arrow
107. displacement path
108. arrow
109. arrow
110. displacement element
111. recess
112. retaining frame
113. positioning plate
114. thickness adjusting device
115. guide
116. position altering device
117. coupling member
118. control device
119. input unit
120. switch-over unit
121. supply unit
122. outlet
123. pump
124. position determining device
125. inlet
126. sensor
127. sensor
128. sensor
129. sensor
130. sensor
131. sensor
132. heating element
133. cooling device
134. insulating layer
135. receiving space
136. surface
137. surface
138. intermediate element
139. intermediate element
140. overall height
141. thickness
142. thickness
143. height
144. height
145. grouped row
146. grouped row
147. grouped row
148. grouped row
149. grouped row
150. grouped row
151. medial longitudinal axis
152. lateral area
153. lateral area
154. cross-flow duct
155. cross-flow duct
156. cross-flow duct
157. cross-flow duct
158. base contour shape
159. double arrow
160. intermediate plate
161. lateral portion
162. lateral portion 163. width
164. thickness
165. mold surface
166. mold surface
167. plane
168. overlap area
169. aperture
170. distributing means
171. connecting nozzle
172. connecting duct
173. longitudinal section
174. longitudinal section
175. longitudinal section
176. longitudinal section
177. inlet opening
178. outlet opening

What is claimed is:

1. Device for mixing and/or thermal homogenization of at least one free-flowing fluid of plastic and/or natural substance in a flow duct between an inlet and an outlet area with a mold lid and a mold base which have mold surfaces facing one another and arranged at a distance from one another, deflector members being located one behind the other in a plurality of rows in succession on at least one of the mold surfaces, the deflector members being offset to one another in succeeding rows, characterized in that there are located in the mold surface lying opposite the mold surface having the deflector members, recesses associated with and positioned opposite the deflector members, and in that each deflector member has at least a height which corresponds to the distance between the mold surfaces, and in that a cross-sectional area of the flow duct, in the area of deflector members respectively located one behind the other in the conveyance direction in a transverse plane aligned vertically to a conveyance direction of the fluid, is greater than a cross-sectional area of the flow duct when there is a rectilinear configuration of the flow duct in the conveyance direction between two transverse planes.

2. Device according to claim 1, characterized in that the deflector member on one mold surface projects at least at intervals into the recess in the other mold surface.

3. Device according to claim 1, characterized in that in one mold surface only recesses are formed, and in the other mold surface only deflector members are formed.

4. Device according to claim 1, characterized in that recesses and deflector members are formed alternatingly and in succession in a row extending transversely to the conveyance direction on a mold surface.

5. Device according to claim 1, characterized in that the deflector members are formed by truncated cones, and are formed in the area of their cover surface with a convex, calotte-shell-shaped cover surface.

6. Device according to claim 5, characterized in that the recesses are in the form of ellipsoids of rotation.

7. Device according to claim 6, characterized in that a small semiaxis of the ellipsoid of rotation is greater than the larger radius of the truncated cone of the associated deflector member and a large semiaxis of the ellipsoid of rotation is longer than a height of the deflector members.

8. Device according to claim 7, characterized in that the length of the small semiaxis of the section of the ellipsoid of rotation is greater by at least twice the thickness of the layer in the flow duct.

9. Device according to claim 5, characterized in that the recesses are formed by a truncated cone, and have a base surface in a concave or calotte-shell-shaped form.

10. Device according to claim 9, characterized in that a conical angle of the truncated cones of the deflector members is greater than a conical angle of the truncated cones of the recesses.

11. Device according to claim 9, characterized in that an outside diameter of the truncated cone of the recess is greater than the outside diameter of the associated deflector member.

12. Device according to claim 11, characterized in that the deflector members are formed by calotte-shells or sections.

13. Device according to claim 1, characterized in that at least one deflector member is adjustable or settable in a direction vertical to the mold surface.

14. Device according to claim 13, characterized in that the adjustable deflector member is connected with a controlled adjusting drive.

15. Device according to claim 1, characterized in that the mold base and the mold lid are settable or adjustable relative to one another in a direction vertical to their mold surfaces.

16. Device according to claim 1, characterized in that at least one of the mold base and the mold lid is connected to a vibratory drive.

17. Device according to claim 16, characterized in that the vibratory drive generates a vibratory movement aligned vertically to the mold surfaces.

18. Device according to claim 16, characterized in that the vibratory drive generates a vibratory movement aligned parallel to the mold surfaces.

19. Device for mixing and/or thermal homogenization of at least one free-flowing fluid of plastic and/or natural substance, with a casing comprising a mold lid and a mold base which have mold surfaces facing one another and arranged at a distance from one another and with at least one intermediate plate located therebetween and likewise having mold surfaces and flow ducts extending between an inlet and an outlet area, there being, located on at least one of the mold surfaces, deflector members arranged in succession in a plurality of rows, and which in succeeding rows are offset to one another, characterized in that the device has two flow ducts extending parallel to one another and spaced apart from one another, one flow duct being defined by the mold surface of the mold lid and the mold surface of the intermediate plate facing it, and the other flow duct being defined by the mold surface of the mold base and the mold surface of the intermediate plate facing it, and the deflector members being located in each of the flow ducts on the mold surface of the mold lid, and recesses being arranged in the mold surfaces of the intermediate plate, said recesses being associated with and positioned opposite the respective deflector members, and in that the deflector member has at least a height corresponding to the distance between adjacent mold surfaces, and in that the deflector members of the mold surfaces, opposite one another and spaced furthest from one another, of the two flow ducts are aligned towards one another, the recesses of the two flow ducts overlap one another, and in that a cross-sectional area of the flow duct, in the area of respective deflector members located one behind the other in a conveyance direction, in a transverse plane aligned vertically to the conveyance direction of the fluid, is greater in the area of the deflector members than a cross-sectional area of the flow duct when there is a rectilinear configuration in the conveyance direction of the flow duct between two transverse planes.

20. Device according to claim 19, characterized in that apertures are located between the recesses associated with one another of the flow ducts extending parallel to one another.

21. Device according to claim 19, characterized in that connecting ducts are located in the intermediate plate so as to form connections between recesses located in the opposite mold surfaces of the intermediate plate.

22. Device according to claim 21, characterized in that an inlet opening and an outlet opening in the connecting duct are offset in the conveyance direction and/or transversely to one another, and the inlet opening is located in one flow duct and the outlet opening in the other flow duct.

23. Device according to claim 21, characterized in that in the area of each flow duct there are located inlet and/or outlet openings of different connecting ducts, and the inlet opening, associated with the respective connecting duct seen in the conveyance direction is located in front of the outlet opening.

24. Device according to claim 21, characterized in that duct cross-sections of the connecting ducts aligned from one flow duct into the other flow duct have the same cross-sectional area as the connecting ducts aligned from the other flow duct in the direction of the one flow duct.

25. Device according to claim 21, characterized in that an inlet opening of the connecting duct is located in the area of a narrowing cross-sectional area of a transition zone of one flow duct, and an outlet opening of the connecting duct is located in a transitional area of the other flow duct in which the cross-sectional area enlarges in the conveyance direction.

26. Device according to claim 19, characterized in that ducts for a heat-treatment agent are located in at least one of the mold lid and the mold base and the intermediate plate.

27. Device according to claim 19, characterized in that recesses for heating bars are located in at least one of the mold lid and the mold base and the intermediate plate.

28. A method for mixing at least one free-flowing fluid, comprising:

causing the fluid to flow generally in a conveyance direction;

distributing the fluid into a layer having a width measured in a transverse direction perpendicular to the conveyance direction that is greater than a thickness of the layer measured in a height direction perpendicular to the conveyance and height directions, the layer being made up of a plurality of individual partial areas flowing generally in the conveyance direction and arranged side-by-side in the transverse direction, each partial area having a cross-sectional flow area defined in a transverse plane perpendicular to the conveyance direction, and the cross-sectional flow areas of adjacent partial areas being different from one another;

subjecting each of the partial areas of the layer to a spatial deformation such that the layer remains cohesive during the entire time of mixing and immediately adjacent partial areas are deformed in different ways in both the height and transverse directions as the layer flows in the conveyance direction, such that in each of a plurality of transverse planes spaced apart in the conveyance direction some partial areas are deformed to a relatively greater degree in the height direction and have cross-sectional flow areas that are greater than other adjacent partial areas, wherein partial areas of the layer are deformed in the height direction such that said partial areas form sub-layers offset in the height direction, the partial areas that are deformed in the height direction following flow paths between successive transverse planes that exceed a distance between said transverse planes in the conveyance direction.

29. Method according to claim 28, characterized in that the individual partial areas extending parallel to one another in succession in the conveyance direction are deformed on different cross-sectional surfaces.

30. Method according to claim 28, characterized in that longitudinal sections with a larger cross-section and longitudinal sections with a smaller cross section alternate between a plurality of successive transverse planes.

31. Method according to claim 28, characterized in that a volume flow of the fluid per unit of time is of equal magnitude in a plurality of partial areas adjacent to one another and extending parallel to one another.

32. Method according to claim 28, characterized in that the fluid in the partial areas directly adjacent to one another, at least in some longitudinal sections, is moved forwards at different flow speeds, at least in the flow direction.

33. Method according to claim 32, characterized in that at least the flow speeds of the fluid which are different in the flow direction in the individual longitudinal sections, are established by different cross-sectional areas of the partial area in succession in the flow direction.

34. Method according to claim 28, characterized in that the layer is deformed in successive longitudinal sections of the partial areas in a direction extending parallel to the thickness, into sub-layers offset relative to one another at least by the greater part of the dimension of the thickness.

35. Method according to claim 28, characterized in that a length of the flow paths between transverse planes in direct succession in the flow direction is alterable.

36. Method according to claim 28, characterized in that the layer is guided, in successive longitudinal sections of the partial areas, alternately in the height direction offset at least by the thickness of the layer.

37. Method according to claim 28, characterized in that cross-sectional areas of the partial areas ahead of and after the spatial deformation are of identical magnitude in partial areas adjacent to one another.

38. Method according to claim 28, characterized in that the flow speed of the fluid in the partial areas of the layer adjacent to one another, in the transverse plane directly subsequent to the spatial deformation in the conveyance direction, is of equal magnitude.

39. Method according to claim 28, characterized in that the layer, in a transverse plane in the partial areas adjacent to one another, is deformed in a direction extending parallel to the thickness, offset at least by the thickness, and has a different thickness.

40. Method according to claim 28, characterized in that the thickness of the layer, with an increasing spacing from a passage plane connecting the area in front of the spatial deformation with the area directly after the spatial deformation of the layer rectilinearly in the flow plane, is greater than in the area in front of the spatial deformation.

41. Method according to claim 28, characterized in that the pressure in the fluid in an area before the spatial deformation is higher than in an area after the spatial deformation.

42. Method according to claim 28, characterized in that a pressure drop between an area before the spatial deformation and an area after the spatial deformation is adjustable.

43. Method according to claim 42, characterized in that adjustment of the pressure drop between the area before the spatial deformation and the area after the spatial deformation is effected by an alteration in the cross-sectional volume of the layer.

44. Method according to claim 42, characterized in that the pressure drop between the area directly before and the area directly after the spatial deformation is of equal magnitude in partial areas adjacent to one another.

45. Method according to claim 42, characterized in that the pressure of the fluid, at least in the area before the spatial deformation and in the area directly after the spatial deformation, is detected, and is kept to a predeterminable value by alteration in the volume of the layer and/or of a partial area of the layer.

46. Method according to claim 42, characterized in that the pressure drop between the area directly before and the area directly after the spatial deformation is altered or kept to a predeterminable value by alteration in the temperature of the fluid.

47. Method according to claim 46, characterized in that the temperature of the fluid between the area before the spatial deformation and the area after the spatial deformation is monitored or detected at least at one point.

48. Method according to claim 28, characterized in that fluctuations in a temperature of the fluid in the layer from a desired temperature are detected or monitored at a plurality of points.

49. Method according to claim 28, characterized in that a fluctuation in temperature of the layer or in a partial area of the layer from a required temperature, is compensated for by the application of or removal of energy.

50. Method according to claim 28, characterized in that a cross-sectional area of a transition zone between two sub-layers of the layer is altered intermittently.

51. Method according to claim 50, characterized in that alteration in a thickness of the cross-sectional area of the transition zone in a plane vertical to the flow direction is effected intermittently in opposed directions.

52. Method according to claim 50, characterized in that the alteration in the cross-sectional area of the transition zones is effected alternatingly in a direction extending in the flow direction.

53. Method according to claim 28, characterized in that the alteration in the cross-sectional area in the vertical plane is effected in a direction extending parallel to the sub-layers of the layer offset to one another.

54. Method according to claim 28, characterized in that adjacent sub-layers are interconnected by a hollow-profile-shaped transition zone, and in that a cross-sectional surface of this transition zone is successively altered via a presettable portion of an arc length, moved along in a circumferential direction.

55. Method according to claim 28, characterized in that the thickness of the layer is altered spatially with a pre-defined vibration.

56. Method according to claim 28, characterized in that the thickness of the layer is spatially altered with a pre-defined vibration at a frequency of above 1 Hz.

57. Method according to claim 28, characterized in that the thickness of the layer is deformed in the flow direction alternatingly and in succession.

58. Method according to claim 57, characterized in that the alteration in the thickness of the layer in the partial areas located in a central area of the layer is higher than in lateral areas.

59. A method for mixing at least one free-flowing fluid, comprising:

causing the fluid to flow generally in a conveyance direction;

distributing the fluid into at least two layers each having a width measured in a transverse direction perpendicular to the conveyance direction that is greater than a thickness of the layer measured in a height direction perpendicular to the conveyance and height directions, the layers flowing generally parallel to each other in the conveyance direction and spaced apart in the height direction, each layer being made up of a plurality of individual partial areas flowing generally in the conveyance direction and arranged side-by-side in the transverse direction, each partial area having a cross-sectional flow area defined in a transverse plane perpendicular to the conveyance direction, and the cross-sectional flow areas of adjacent partial areas being different from one another;

subjecting each of the partial areas of each layer to a spatial deformation such that the layer remains cohesive during the entire time of mixing and immediately adjacent partial areas are deformed in different ways in both the height and transverse directions as the layer flows in the conveyance direction, such that in each of a plurality of transverse planes spaced apart in the conveyance direction some partial areas are deformed to a relatively greater degree in the height direction and have cross-sectional flow areas that are greater than other adjacent partial areas, wherein the partial areas that are deformed in the height direction follow flow paths between successive transverse planes that exceed a distance between said transverse planes in the conveyance direction, and wherein partial flows of each of the layers are deformed in the height direction toward the other layer such that said partial flows form sub-layers offset in the height direction, the layers being mixed together in the area of their respective sub-layers.

60. Method according to claim 59, characterized in that in a transitional area between the respective sub-layers of one layer, a partial area of the one layer is separated and branched off from the one layer, and is passed to a transitional area between the sub-layers of the other layer.

61. Method according to claim 60, characterized in that the partial area between the transitional areas is passed in a three-dimensional direction extending obliquely from the one layer to the other layer.

62. Method according to claim 60, characterized in that the partial area branched off from the one layer encloses with the one layer an angle of less than 90°.

63. Method according to claim 60, characterized in that the transitional area of the one layer from which the partial area is removed has a cross-sectional area that tapers down in the conveyance direction of the fluid and the transitional area of the other layer has a cross-sectional area that enlarges in the conveyance direction of the fluid.

64. Method according to claim 60, characterized in that partial areas are passed from the one layer to the other layer, and partial areas are returned from the other layer to the one layer.

* * * * *

UNITED STATES PATENT AND TRADEMARK OFFICE
CERTIFICATE OF CORRECTION

PATENT NO. : 6,106,146
DATED : August 22, 2000
INVENTOR(S) : Langecker et al.

It is certified that error appears in the above-identified patent and that said Letters Patent is hereby corrected as shown below:

Column 36, line 5, "claim 11" should read --claim 1--.

Column 39, line 31, "claim 28" should read --claim 50--.

Signed and Sealed this

Twenty-fourth Day of April, 2001

Attest:

NICHOLAS P. GODICI

Attesting Officer     Acting Director of the United States Patent and Trademark Office